US010366305B2

(12) United States Patent
Kayanuma et al.

(10) Patent No.: US 10,366,305 B2
(45) Date of Patent: Jul. 30, 2019

(54) FEATURE VALUE EXTRACTION METHOD AND FEATURE VALUE EXTRACTION APPARATUS

(71) Applicant: SOINN Holdings LLC, Kodaira-shi, Tokyo (JP)

(72) Inventors: Toru Kayanuma, Tokyo (JP); Osamu Hasegawa, Tokyo (JP); Takahiro Terashima, Tokyo (JP)

(73) Assignee: SOINN INC., Tokyo (JP)

( * ) Notice: Subject to any disclaimer, the term of this patent is extended or adjusted under 35 U.S.C. 154(b) by 0 days.

(21) Appl. No.: 15/579,002

(22) PCT Filed: Feb. 3, 2017

(86) PCT No.: PCT/JP2017/004054
§ 371 (c)(1),
(2) Date: Dec. 1, 2017

(87) PCT Pub. No.: WO2017/145711
PCT Pub. Date: Aug. 31, 2017

(65) Prior Publication Data
US 2018/0173991 A1  Jun. 21, 2018

(30) Foreign Application Priority Data

Feb. 24, 2016  (JP) ................. 2016-033208
Apr. 20, 2016  (JP) ................. 2016-084534

(51) Int. Cl.
*G06K 9/46* (2006.01)
*G06T 7/70* (2017.01)
*G06K 9/00* (2006.01)
*G06K 9/32* (2006.01)

(52) U.S. Cl.
CPC ....... *G06K 9/4671* (2013.01); *G06K 9/00664* (2013.01); *G06K 9/00778* (2013.01);
(Continued)

(58) Field of Classification Search
CPC .......... G06T 7/70; G06T 2207/10016; G06K 9/00664; G06K 9/4671; G06K 9/00778; G06K 2009/3291
(Continued)

(56) References Cited

U.S. PATENT DOCUMENTS 9,224,043 B2 * 12/2015 Hasegawa ............ G05D 1/0274
2013/0108172 A1   5/2013 Tongprasit et al.
(Continued)

FOREIGN PATENT DOCUMENTS

JP  2011-53823 A   3/2011
JP  2011-215716 A  10/2011
(Continued)

OTHER PUBLICATIONS

Kayanuma, Toru, et al., "Simultaneous Localization and Mapping by Hand-Held Monocular Camera in a Crowd," IEICE Technical Report, MVE2014-49-MVE2014-73, Multimedia and Virtual Environment, vol. 114, No. 410, Jan. 15, 2015, PRMU2014-109, pp. 265-270.
(Continued)

*Primary Examiner* — Daniel G Mariam
(74) *Attorney, Agent, or Firm* — Snyder, Clark, Lesch & Chung, LLP

(57) ABSTRACT

To precisely extract a static feature value from consecutive images taken in a dynamic environment that is crowded by many people. A feature value extraction apparatus includes: a consecutive-image acquisition unit configured to acquire consecutive images that are consecutively taken; a local feature value extraction unit configured to extract a local feature value at each feature point from the consecutive images; a feature value matching unit configured to perform matching between the consecutive input images for the local feature value extracted by the local feature value extraction
(Continued)

unit; and an invariant feature value calculation unit configured to acquire, in the local feature values for which matching between a predetermined number of consecutive images has been obtained by the feature value matching unit, an average of the local feature values whose position changes between the consecutive images are equal to or less than a predetermined threshold value as invariant feature value.

5 Claims, 19 Drawing Sheets

(52) U.S. Cl.
CPC ........ *G06T 7/70* (2017.01); *G06K 2009/3291* (2013.01); *G06T 2207/10016* (2013.01)

(58) Field of Classification Search
USPC ........................................ 382/195
See application file for complete search history.

(56) References Cited

U.S. PATENT DOCUMENTS

| 2013/0216098 A1 | 8/2013 | Hasegawa et al. |
| 2015/0294157 A1 | 10/2015 | Hasegawa et al. |

FOREIGN PATENT DOCUMENTS

| JP | 2012-64131 A | 3/2012 |
| WO | 2011145239 A1 | 11/2011 |
| WO | 2012035707 A1 | 3/2012 |
| WO | 2014073204 A1 | 5/2014 |

OTHER PUBLICATIONS

International Search Report issued in corresponding International Application No. PCT/JP2017/004054 dated Apr. 25, 2017, 4 pages.

* cited by examiner

Require:
$N$ : Number of sequential image
$P_i = (p_{0,i}, p_{1,i}, ..., p_{n_{i-1},i}, p_{n_i,i})$ : Set of local features
for $i = 1$ to $N$ do
    $P_i^{PIRF}, P_{i-1}^{PIRF}, n_i^{PIRF}$ {See Algorithm2}
    $GoodCenterOfGravity \leftarrow false$
    while $GoodCenterOfGravity = false$ do
        $a, b, c$ : Random int $(a, b, c \leq n_i^{PIRF}, a \neq b \neq c)$
        $CG_i \leftarrow (p_{a,i}^{PIRF} + p_{b,i}^{PIRF} + p_{c,i}^{PIRF})/3$
        $CG_{i-1} \leftarrow (p_{a,i-1}^{PIRF} + p_{b,i-1}^{PIRF} + p_{c,i-1}^{PIRF})/3$
        $CGV_i \leftarrow CG_i - P_{abc,i}^{PIRF}$
        $CGV_{i-1} \leftarrow CG_{i-1} - P_{abc,i-1}^{PIRF}$
        if $RoD(i, i-1) \leq Thr_{ICGM}$ then
            $GoodCenterOfGravity \leftarrow true$
            Delete $p_{a,i}^{PIRF}, p_{b,i}^{PIRF}, p_{c,i}^{PIRF}$ from $P_i^{PIRF}$
            Delete $p_{a,i-1}^{PIRF}, p_{b,i-1}^{PIRF}, p_{c,i-1}^{PIRF}$ from $P_{i-1}^{PIRF}$
        end if
    end while
    for $j = 1$ to $n_i^{PIRF}$ do
        $CGV_i \leftarrow CG_i - P_{j,i}^{PIRF}$
        $CGV_{i-1} \leftarrow CG_{i-1} - P_{j,i-1}^{PIRF}$
        if $RoD(i, i-1) \leq Thr_{ICGM}$ then
            $P_i^{ICGM2.0} \leftarrow p_{j,i}^{PIRF}$
            $P_{i-1}^{ICGM2.0} \leftarrow p_{j,i-1}^{PIRF}$
        end if
    end for
end for

Fig. 4

Require:
$N$ : Number of sequential image
$P'_i = (p'_{1,i}, p'_{2,i}, ..., p'_{n'_{i-1},i}, p'_{n'_i,i})$ : Set of local features in $i^{th}$ image after PIRF {See Algorithm2}
$n'_i$ : Number of local features of $P'_i$
$Dist_i = (dist_{1,i}, dist_{2,i}, ..., dist_{n'_{i-1},i}, dist_{n'_i,i})$ : Set of sorted matching distances of $P'_i$ for $i = 1$ to $N$ do
   $GoodCenterOfGravity \leftarrow false$
   while $GoodCenterOfGravity = false$ do
     $s_1, s_2, ..., s_k \leftarrow$ Subscript of $\min(Dist_i)$, second $\min(Dist_i),..., k^{th} \min(Dist_i)$
     $CG_i \leftarrow (p'_{s_1,i} + ... + p'_{s_k,i})/k$
     $CG_{i-1} \leftarrow (p'_{s_1,i-1} + ... + p'_{s_k,i-1})/k$
     $CGV_i \leftarrow CG_i - (p'_{s_1,i}, ..., p'_{s_k,i})$
     $CGV_{i-1} \leftarrow CG_{i-1} - (p'_{s_1,i-1}, ..., p'_{s_k,i-1})$
     Delete $\min(Dist_i)$, second $\min(Dist_i),..., k^{th} \min(Dist_i)$ from $Dist_i$
     if $RoD \leq Thr_{CG}$ then
       $GoodCenterOfGravity \leftarrow true$
       Delete $p'_{s_1,i}, ..., p'_{s_k,i}$ from $P'_i$
       Delete $p'_{s_1,i-1}, ..., p'_{s_k,i-1}$ from $P'_{i-1}$
     end if
   end while
   $CGV_i \leftarrow CG_i - P'_i$
   $CGV_{i-1} \leftarrow CG_{i-1} - P'_{i-1}$
   for $j = 1$ to $n'_i$ do
     if $RoD \leq Thr_{ICGM}$ then
       $p_i^{ICGM2.5} \leftarrow p'_{j,i}$
       $p_{i-1}^{ICGM2.5} \leftarrow p'_{j,i-1}$
     end if
   end for
end for

Fig. 16

Require:
$w$ : Number of regression frame
$n_i$ : Number of local feature of $i^{th}$ image
$P_i = (p_{1,i}, p_{2,i}, ..., p_{n_i-1,i}, p_{n_i,i})$ : Set of local features in $i^{th}$ image for $l = i - w$ to $i$ do
  for $j = 1$ to $n_i$ do
    if $isFoundInAllImage(p_{j,l})$ then
      $P'_l \leftarrow p_{j,l}$
      $P'_{l-1} \leftarrow p_{j,l-1}$
      $n'_l \leftarrow n'_l + 1$
    end if
  end for
end for

Fig. 19

FEATURE VALUE EXTRACTION METHOD AND FEATURE VALUE EXTRACTION APPARATUS

TECHNICAL FIELD

The present invention relates to a feature value extraction method and a feature value extraction apparatus that remove a dynamic feature value from a plurality of consecutive images to extract a stable and static feature value.

BACKGROUND ART

Recently, demands for navigation of people and robots in unknown environments are increasing. In order to satisfy such demands, it is necessary to autonomously build an environment map and localize those own positions. A problem of the autonomous map building and localization is generally called as SLAM (Simultaneous Localization And Mapping) and has been widely studied. Further, in recent years, studies for applying the SLAM technology to unmanned aerial vehicles and automobiles have been developed.

However, the general SLAM assumes a static environment. In contrast, an actual environment where we live is a dynamic environment where many people and objects come and go. Therefore, when it is attempted to apply the existing SLAM method to the actual environment, there is a problem that moving persons and animals are misrecognized as landmarks so that accuracy of the SLAM deteriorates.

For such autonomous map building and localization, how to accurately extract a feature value of a surrounding environment is a major point. In general, as a method for extracting a local feature value from the environment, there are an Affine invariant feature value (MSER, Harris-Affine, Hessian-Affine, Salient Region, or the like) and feature values invariant to scale change (SIFT: Scale Invariant Feature Transformation, SURF: Speed Up Robustness Features, or the like).

Further, there are PIRF (Position-Invariant Robust Features) that are feature values acquired by further extracting only feature values robust to shooting position change from local feature values extracted from each image in consecutive images by the above-described method (Patent Literatures 1 to 3). Note that autonomous map building using the PIRF have been already proposed (Patent Literature 4). In the PIRF, the feature value is selected under the assumption that there should be a static and stable feature value over several frames between the consecutive images. Here, the PIRF indicate the local feature values such as the SIFT and the SURF that are commonly present between the consecutive images. By using the PIRF, because dynamic feature values that are not common between the consecutive images can be removed, high accuracy can be achieved even in the dynamic environment as compared to a case of simply using the local feature values including the SIFT and the SURF.

Here, a definition of the dynamic feature value will be described in detail. When there are only static objects in the surrounding environment, for example, it can be considered that there is no significant change in a shot object and its position even when consecutive shot images are compared over several frames. Meanwhile, when a moving person or object is shot by a camera, it can be observed that the moving person or object disappears from the image and its position in the image is changed when the person or object is compared over the several frames in the consecutive images. Thus, the moving person or object can be specified by comparing the consecutive images over the several frames. Hereinafter, the local feature value, whose position widely changes when the local feature value acquired from the consecutive images are compared over the several frames, is defined as the dynamic feature value.

In addition, ICGM (Incremental Center of Gravity Matching) has been proposed as a method of extracting the local feature value from the environment (Patent Literature 5). In the ICGM, a dynamic local feature value of a dynamic object and a static and stable local feature value of a static object can be distinguished by defining vectors from a centroid position of a plurality of local feature values to each local feature value and comparing these vectors between the consecutive images.

CITATION LIST

Patent Literature

[Patent Literature 1] Japanese Unexamined Patent Application Publication No. 2011-53823
[Patent Literature 2] Japanese Unexamined Patent Application Publication No. 2011-215716
[Patent Literature 3] International Patent Publication No. WO 2011/145239
[Patent Literature 4] International Patent Publication No. WO 2012/035707
[Patent Literature 5] International Patent Publication No. WO 2014/073204

SUMMARY OF INVENTION

Technical Problem

However, in the PIRF described in Patent Literature 4, it is impossible to remove the dynamic feature value that is common between the consecutive images and, however, is moving within the frames in the consecutive images. Since such dynamic feature value is included in the PIRF, the accuracy of the SLAM deteriorates.

In the ICGM described in Patent Literature 5, the centroid position is acquired based on a premise for an algorithm that only static feature values are selected. In the ICGM, the local feature values to acquire the centroid position are randomly selected. However, there are simultaneously the dynamic feature value and the static feature value in the feature values to be selected. Accordingly, there is a possibility that the dynamic feature value is selected. In this case, the centroid position acquired from the dynamic feature values greatly changes between the previous and next images. When the centroid position has greatly changed in such a way, a vector from the centroid position to the static feature value has also greatly changed. Thus, there is a possibility that the static feature value is erroneously determined as the dynamic feature value and thereby removed. As a result, the accuracy of the SLAM is reduced when applying the ICGM to the SLAM.

The present invention has been made to solve the above-described problem and an object thereof is to accurately extract a static feature value from consecutive images taken in a dynamic environment crowded with many people.

Other problems of the related art and new features of the present invention will become apparent from the following descriptions of the specification and the attached drawings.

Solution to Problem

A first aspect of the present invention is a feature value extraction method including: a consecutive image acquisition step of acquiring consecutive images that are consecutively taken; a local feature value extraction step of extracting a local feature value at each feature point from the consecutive images acquired by the consecutive image acquisition step; a feature value matching step of performing matching between the consecutive input images for the local feature value extracted by the local feature value extraction step; and an invariant feature value calculation step of acquiring, in the local feature values for which matching between a predetermined number of consecutive images has been obtained in the feature value matching step, an average of the local feature values whose position changes between the consecutive images are equal to or less than a predetermined threshold value as invariant feature value.

A second aspect of the present invention is the feature value extraction method described above, in which, in the invariant feature value calculation step, a matching distance is calculated for each matched local feature value, the matched local feature values are sorted based on the calculated matching distances, a predetermined number of local feature values are selected from the matched local feature values in ascending order of the matching distance, and, in the selected local feature values, the average of the local feature values whose position changes between the consecutive images are equal to or less than the predetermined threshold value is acquired as the invariant feature value.

A third aspect of the present invention is the feature value extraction method described above, in which, in a first frame of the consecutive images, a centroid position of the selected local feature values selected from the matched local feature values is calculated, and a vector between each of the selected local feature values selected from the matched local feature values and the centroid position, in a second frame of the consecutive images temporally preceding or succeeding the first frame, a centroid position of the selected local feature values selected from the matched local feature values is calculated, and a vector between each of the selected local feature values selected from the matched local feature values and the centroid position, and, for each matched local feature value, when an error between the vector acquired in the first frame and the vector acquired in the second frame is equal to or more than a predetermined threshold value, an average of corresponding local feature values is acquired as the invariant feature value.

A fourth aspect of the present invention is the feature value extraction method described above, in which, when the vector acquired in the first frame for each matched local feature value is denoted by $CGV_T$ and the vector acquired in the second frame for each matched local feature value is denoted by $CGV_{T-1}$, RoD that is the error is expressed by the following expressions.

$$RoD = \frac{\|CGV_T - CGV_{T-1}\|}{\|CGV_T\| + \|CGV_{T-1}\|} \qquad \text{[Expression 1]}$$

A fifth aspect of the present invention is a feature value extraction apparatus including: consecutive image acquisition means for acquiring consecutive images that are consecutively taken; local feature value extraction means for extracting a local feature value at each feature point from the consecutive images acquired by the consecutive image acquisition means; feature value matching means for performing matching between the consecutive input images for the local feature value extracted by the local feature value extraction means; and invariant feature value calculation means for acquiring, in the local feature values for which matching between a predetermined number of consecutive images has been obtained by the feature value matching means, an average of the local feature values whose position changes between the consecutive images are equal to or less than a predetermined threshold value as invariant feature value.

Advantageous Effects of Invention

According to the present invention, it is possible to precisely extract a static feature value from consecutive images taken in a dynamic environment crowded with many people.

BRIEF DESCRIPTION OF DRAWINGS

FIG. 4 is a diagram illustrating an ICGM2.0 algorithm according to the first exemplary embodiment;

FIG. 16 is a diagram illustrating an ICGM2.5 algorithm that extracts the static feature value according to the second exemplary embodiment;

FIG. 19 is a diagram illustrating an image of an indoor experimental environment and a result of extracting the feature value by applying the ICGM2.5 to the image;

DESCRIPTION OF EMBODIMENTS

Figure 1:
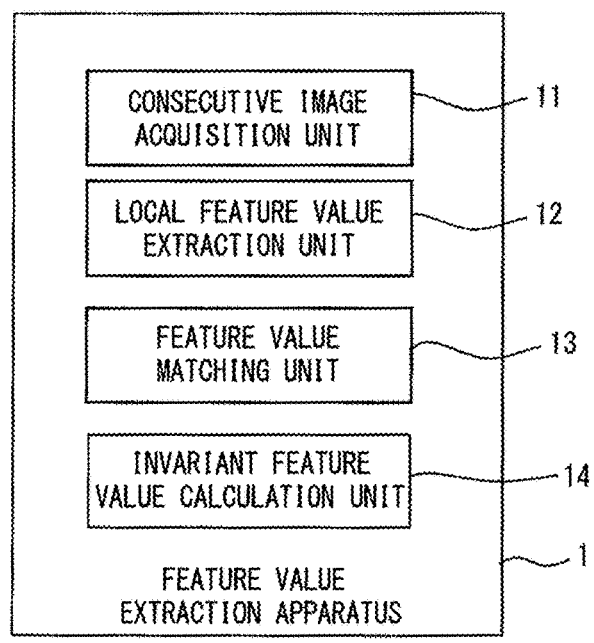
FIG. 1 is a diagram illustrating a feature value extraction apparatus according to a first exemplary embodiment.

Hereinafter, embodiments of the present invention will be described with reference to the drawings. The same elements are denoted by the same reference signs, and repeated descriptions are omitted.

There are the SIFT and a corner point that are feature points widely used in the SLAM that uses images from which the feature points are extracted even in a crowded environment. In general, local feature points including the SIFT and the corner point are easy to correspond and suitable for the SLAM using the images. However, when the SIFT is extracted from images acquired by a photographer in a crowded environment in which many people come and go, there is a problem that a weak feature point that may cancelled by a slight movement of the photographer (a robot or the like) and a feature point of a moving person are frequently extracted. When there are many such unstable feature points, a problem that not only is a processing time unnecessarily extended, but also the SLAM is adversely affected.

In contrast, as described in Patent Literature 1, by applying PIRF (Position Invariant Robust Features), parts, whose appearance changes with respect to the photographer are small, can be extracted as features. Along with this, feature points of parts whose appearance changes are large, which are extracted from a moving person or the like, can be removed.

However, as described above, the PIRF includes not only a feature point extracted from a substantially static object, but also a feature point extracted from a moving object (e.g. a person). Such feature point extracted from the moving object become error factors for the SLAM. Thus, in the present invention, a remaining dynamic feature value is further removed by applying the ICGM after pre-processing using the PIRF. Accordingly, since the dynamic feature value can be accurately removed, it is possible to extract only a more static feature point as compared to the case of merely using the PIRF or the ICGM. Such method for applying both of the PIRF and the ICGM is referred to as ICGM2.0.

The inventors of the present application have earnestly conducted experiments and studies, and have found out a method and apparatus that extract a stable and static feature value even in a crowded environment in which there are many people by extracting the feature value from a plurality of image data using the above-described ICGM2.0.

First Exemplary Embodiment

In the present exemplary embodiment, local feature values included in consecutive images acquired in a dynamic environment such as crowd are divided into a dynamic local feature value from a dynamic object and a stable and static local feature value from a static object, and only a static local feature value is extracted. Therefore, accurate SLAM can be performed. In other words, in the present exemplary embodiment, only the dynamic local feature value is removed from the local feature values included in the consecutive images and the static local feature value is extracted as an invariant feature value.

A feature value extraction apparatus according to the present exemplary embodiment will be described. FIG. 1 is a diagram illustrating the feature value extraction apparatus according to the present exemplary embodiment. As illustrated in FIG. 1, a feature value extraction apparatus 1 according to the present exemplary embodiment includes a consecutive image acquisition unit 11, a local feature value extraction unit 12, a feature value matching unit 13, and an invariant feature value calculation unit 14.

The consecutive image acquisition unit 11 acquires consecutive images that are consecutively shot while a moving object such as a robot is moving. The local feature value extraction unit 12 extracts the local feature value at each feature point from the consecutive images acquired by the consecutive image acquisition unit 11. The feature value matching unit 13 performs matching for the local feature value extracted by the local feature value extraction unit 12 between the consecutive input images. In the local feature values for which matching between a predetermined number of consecutive images has been obtained by the feature value matching unit 13, the invariant feature value calculation unit 14 acquires an average of the local feature values, whose position changes are equal to or less than a predetermined threshold value, as the invariant feature value.

Figure 2:
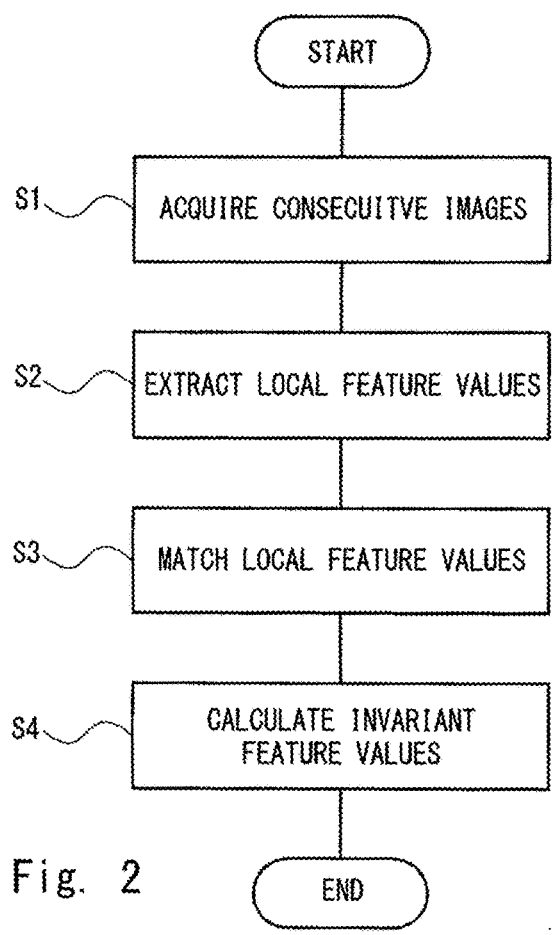
FIG. 2 is a flow chart illustrating a feature value extraction method according to the first exemplary embodiment.

Hereinafter, extraction of the invariant feature value in the feature value extraction apparatus 1 according to the present exemplary embodiment will be described. FIG. 2 is a flow chart illustrating a method for extracting the invariant feature value in the feature value extraction apparatus 1 according to the present exemplary embodiment.

Step S1: Consecutive-Image Acquisition

First, the consecutive image acquisition unit 11 acquires the consecutive images that are consecutively shot while the moving object such as the robot is moving. In the present exemplary embodiment, the PIRF is acquired from the consecutive images. Since the PIRF is the feature values extracted from the multiple consecutive images, the consecutive images that are video images are needed as an input. The consecutive images required for the PIRF constitute a set of images. The consecutive images are the video images consecutively shot every second, for example, two frames per second in a certain frame. That is, the images shot from the video are generally consecutive and it is required that the video images are used as the consecutive images for the PIRF. An acquisition ratio of images is set according to a speed of a camera. For example, when the camera is mounted on a vehicle, the speed of the camera is 1000 m/min and the consecutive images shot from the video are approximately 50 to 100 frames per second.

Figure 3:
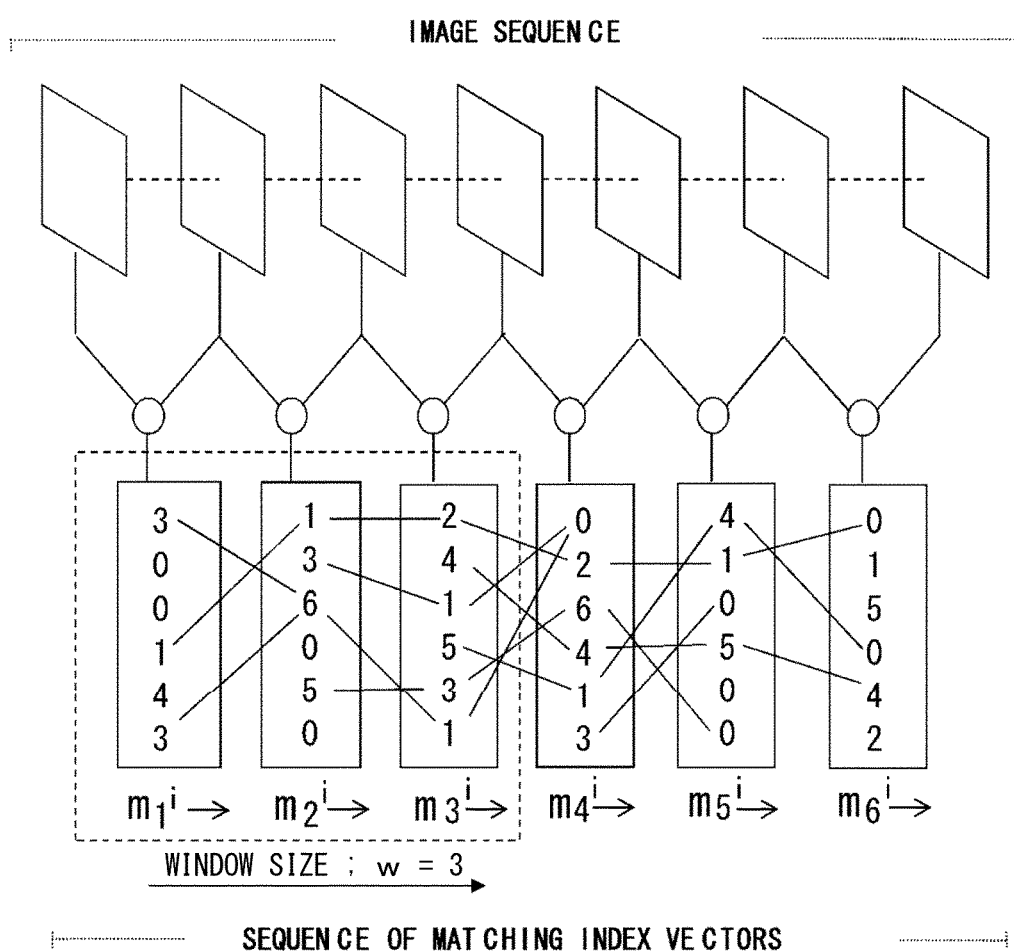
FIG. 3 is a diagram describing a method for extracting feature values PIRF according to the first exemplary embodiment.

Hereinafter, the extraction of the invariant feature value will be described, while the extraction of the PIRF will be particularly described. FIG. 3 is a diagram for describing a method for extracting the feature values PIRF according to the present exemplary embodiment. FIG. 4 illustrates an ICGM2.0 algorithm.

Step S2: Local Feature Value Extraction

The local feature value extraction unit 12 extracts the local feature value at each feature point from the consecutive images acquired by the consecutive image acquisition unit 11. The local feature value extraction unit 12 extracts the local feature value using an existing local feature value extraction method.

For example, the local feature value extraction unit 12 can use the feature value of SIFT (Scale Invariant Feature Transformation) or SURF (Speed Up Robustness Features). It goes without saying that not only these SIFT and SURF but also other local feature values can be used. Especially, it is preferable to use other local feature values that are robust to scale and rotation changes, noise, or the like. By using these local feature values, performance of the existing feature value is also maintained as it is, and it is possible to extract and describe the local feature value as a feature robust to illumination change or the like. Here, $n_i$, denotes the number of images in an i-th area. $U_j^i$ denotes a group of local feature values extracted from a j-th image in the images in the i-th area. Here, the local feature value is denoted by $\vec{u}$.

Step S3: Local Feature Value Matching

The feature value matching unit 13 performs matching for the local feature value between the consecutive images, selects the feature that matching is obtained between the predetermined number of consecutive images, and extracts and describes the feature value and its coordinates extracted from the latest image in the images for which matching is performed as the feature values PIRF.

Specifically, for all the two consecutive images, the feature value matching unit 13 performs matching for each feature value that constitutes the local feature value $\vec{u}$. In sum, for all local feature values in the j=q-th image, matching for all local feature values in the j=q+1-th image is performed. Here, an index of each of the features for which matching has been obtained is acquired as a matching result vector $\vec{m_q^i}$.

Here, an example of a matching method will be described by taking the SIFT as an example. A feature extracted from an image $I_a$ is denoted by v. It is determined whether this feature v matches the feature v' of the next image $I_{a+1}$. First, dot products between the feature v and all the features extracted from the image $I_{a+1}$ are acquired. Then, the calculation results are sorted to acquire the most similar feature $v_{first}$ and the second most similar feature $v_{second}$. When $(v_{first}*v)/(v_{second}*v) > \theta$ is established, it is determined that the matched feature v' is $v_{first}$. Here, the threshold θ can be set to 0.6, for example. When the above-described expression is not established, it is determined that there is no feature matching the feature v of the image $I_a$ in the image $I_{a+1}$.

As illustrated in FIG. 3, the case in which six local feature values are extracted from each input image will be described. Only when matching is performed between these six local feature values and matching is obtained, indices are given to the matched feature values. For example, it is represented that a first local feature value of $m_1^i \rightarrow$ matches a third local feature value of $m_2^i \rightarrow$ and the third feature value of $m_2^i \rightarrow$ matches a sixth feature value of $m_3^i \rightarrow$.

Next, the feature value matching unit 13 selects consecutive feature values. First, it is determined how many $m_q^i \rightarrow$ are used to acquire the consecutive feature values. The number of the $m_q^i \rightarrow$ is referred to as a window size w here. The group of the $m_q^i \rightarrow$ included in the window size w is referred to as a sub place. Here, the lager the window size w, the more robust and the more discriminating consecutive feature values can be extracted. However, the number of the features becomes smaller when the window size w is too large. Since not robust and undiscriminating feature values are also extracted when the window size w is too small, it is necessary to set the window size w to the optimum size.

In the present exemplary embodiment, the window size w is three. Thus, the consecutive feature values are acquired using four consecutive input images. In sum, as illustrated in FIG. 3, a first sub place includes $m_1^i \rightarrow$, $m_2^i \rightarrow$, and $m_3^i \rightarrow$ and corresponds to the input images $I_1$, $I_2$, $I_3$, and $I_4$. Note that, when the number of indices is zero, this indicates that there is no next feature for which the matching is performed. Therefore, in the case of FIG. 3, the first sub place includes three consecutive feature values.

The feature value matching unit 13 shifts the window w one by one after setting the window size w and extracts the feature values that commonly appear in the four images included in the window size. The extracted feature values are the consecutive feature values. After setting the window size w, a function used to extract the consecutive feature values is defined as follows. Note that b denotes the number of index vector that is focused on.

$$f(m_{a,b}^i) = \begin{cases} 1, & \text{if } b = e, m_{(m_{a,b}^i), b+1}^i > 0 \\ f(m_{(m_{a,b}^i), b+1}^i), & \text{if } b \neq e, m_{(m_{a,b}^i), b+1}^i > 0 \\ 0, & \text{Otherwise} \end{cases}$$ [Expression 2]

$$e = b + w - 2$$

The feature value matching unit 13 calculates $f(m_{x,y}^i)$ for all matching result vectors $m_q^i \rightarrow$, and extracts only the local feature value $u_{x,y}^i \rightarrow$ when $f(m_{x,y}^i) > 0$. When the number of the input images is $n_i$ and the window size is w, the number of the sub place is $n_i - w + 1$. Note that this window size may be variable and be appropriately changed according to the surrounding environment or the like.

Step S4: Invariant Feature Value Calculation

The invariant feature value calculation unit 14 calculates an average of the matched local feature values in the sub place that is the same window group. In these vectors, the feature values and those coordinates extracted from the latest image in the sub place constitute a PIRF dictionary. ($n_i - w + 1$) sub place PIRF dictionaries ($D_j^i$, $j \leq n_i - w + 1$) extracted from all the ($n_i - w + 1$) sub places are registered in the PIRF dictionary ($D^i$). Each average of the matched local feature values constituting the PIRF dictionary is the PIRF.

Next, the invariant feature value calculation unit 14 applies the ICGM to the PIRF so as to remove the dynamic local feature value remaining in the PIRF (ICGM2.0).

First, in the ICGM, for each of temporally different frames, the centroid of a plurality of the static local feature values is calculated and the vector from the centroid to each local feature value is acquired. Then, the acquired vectors are compared with each other between the different frames. When the vectors to each local feature value are different, the local feature value is identified as the dynamic local feature value.

Figure 5:
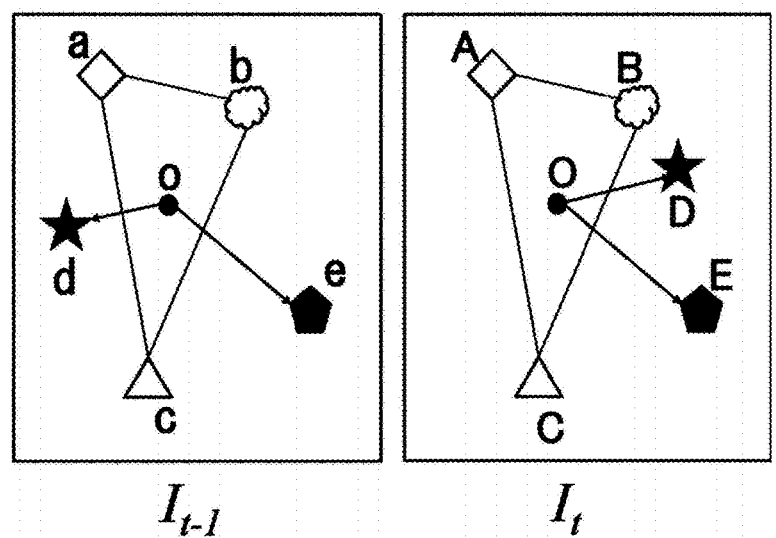
FIG. 5 is a diagram illustrating a relation between a centroid and a vector in ICGM.

In the ICGM, as illustrated in FIG. 5, for example, it is assumed that there are feature values A, B, C, D and E in an image $I_t$, and there are corresponding feature values a, b, c, d and e in $I_{t-1}$. Further, it is assumed that the feature values A, B and C are the static feature values and the feature values D and E are unknown whether they are dynamic or static. The same applies to the corresponding feature values. In this case, in the ICGM, the centroid O of the static feature values A, B and C is initially calculated and the centroid o of a, b and c are similarly calculated. Next, the vectors from the centroid O to the feature values D and E that are unknown whether they are dynamic or static and the vectors from the centroid o to the feature values d and e that are unknown whether they are dynamic or static are calculated.

In the example of FIG. 5, $\overrightarrow{OD}$ and $\overrightarrow{od}$ are different between the frames, $\overrightarrow{OE}$ and $\overrightarrow{oe}$ are the same between the frames. Accordingly, the feature value D is identified as the dynamic feature value and the feature value E is identified as the static feature value.

First, the invariant feature value calculation unit 14 calculates the centroid position of the local feature values extracted using the PIRF. Here, it is assumed that the number of the extracted local feature values using the PIRF is n that is any positive integer. When a coordinate of the local feature value extracted using the PIRF is denoted by $p_i$ in which i is an integer satisfying $0 \le i \le n$, the centroid position CG is expressed by the following expression (1).

[Expression 3]

$$CG = \begin{bmatrix} X \\ Y \end{bmatrix} = \frac{1}{n}\sum_{i=0}^{n} pi \quad (1)$$

A factor of the vector from the centroid position CG to the coordinate of any local feature value $P_x$ is defined as shown by the following expression (2).

[Expression 4]

$$CGV_x = CG_x - P_x = \frac{1}{n}\sum_{i=0}^{n} p_{ix} - P_x \quad (2)$$

From the expression (2), in the temporally consecutive frames $I_{t-1}$ (also referred to as a second frame) and $I_t$ (also referred to as a first frame), vectors $CGV_{T-1}$ and $CGV_T$ representing a relation between the centroid position CG and the local feature value p for which matching is performed between the frames are acquired. An error rate RoD is calculated by applying these vectors to the following expression (3).

[Expression 5]

$$RoD = \frac{\|CGV_T - CGV_{T-1}\|}{\|CGV_T\| + \|CGV_{T-1}\|} \quad (3)$$

The RoD is compared with a threshold Thr. When RoD≤Thr, it is determined that the local feature value is the static local feature value. When RoD>Thr, it is determined that the local feature value is the dynamic local feature value and this local feature value is removed, and the remaining local feature values constitute an ICGM2.0 dictionary.

The local feature values included in the ICGM2.0 dictionary extracted in such a way are matched feature values in all adjacent images in the SIFT feature points extracted from each image, and are extracted as the local feature values in which the dynamic feature points are removed. Accordingly, only the static or substantially static feature value can be mainly extracted.

Verification of Advantage of ICGM2.0 by Experiment

First Example: Dynamic Feature Value Removal

Here, for verifying an advantage of the ICGM2.0, a result of removing the dynamic feature value is evaluated. An environment in which many people come and go is selected as an experimental environment for the evaluation. It is assumed that a threshold $Thr_{PIRF}$ for the matching of the local feature value of the PIRF is 65 and a threshold $Thr_{ICGM}$ for an error rate of the ICGM is 0.7. For the ICGM2.0, it is also assumed that $Thr_{PIRF}$=65 and $Thr_{ICGM}$=0.7.

In the present example, the ORB (E. Rublee, V. Rabaud, K. Konolige and G. Bradski, "ORB: an efficient alternative to SIFT or SURF", Proc. International Conference on Computer Vision, 2011) is used as the local feature value. Similarly to the SIFT and the SURF, advantages of the ORB are that the ORB is a local feature value robust to rotation, scale change, illumination change, or the like, fast calculation speed, and high matching accuracy. According to the ORB, a calculation speed of 100 times faster than the SIFT and 10 times faster than the SURF is achieved. Additionally, the matching accuracy is equal to or more than those of the SIFT and the SURF.

Figure 6:
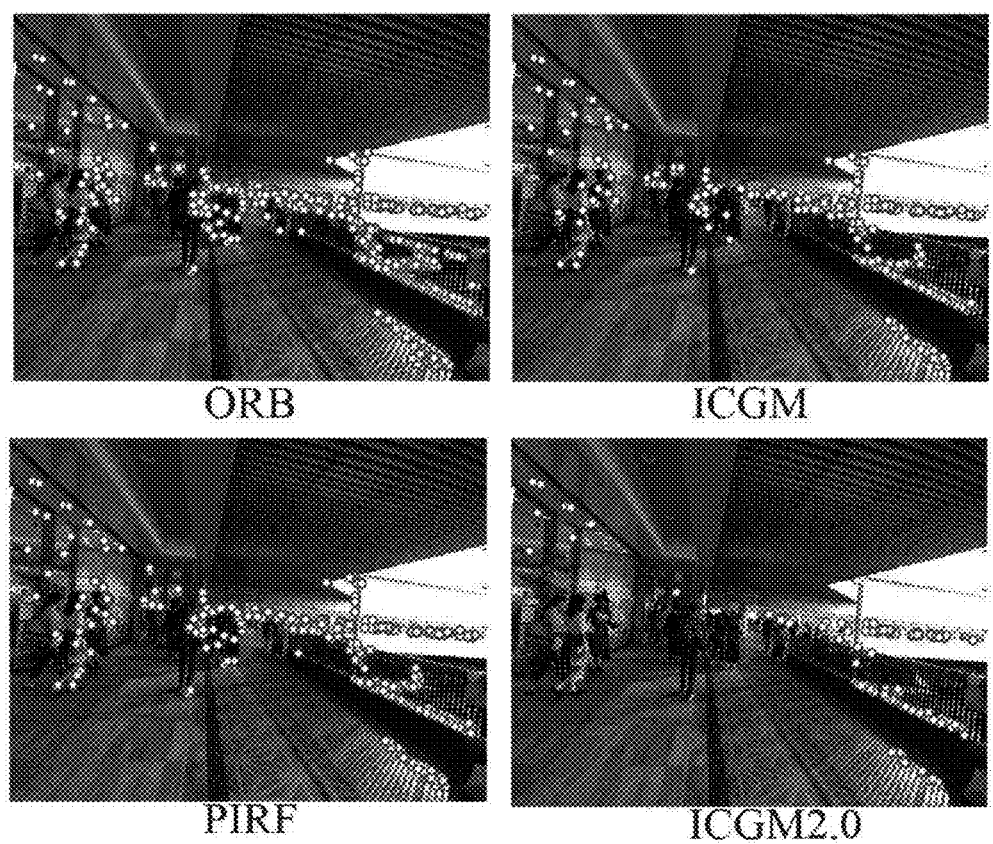
FIG. 6 is a diagram illustrating a result of removing a dynamic feature value.

FIG. 6 illustrates results of processing for removing the dynamic feature value by the known method (the ORB (that is, when neither the PIRF, the ICGM, nor the ICGM2.0 is applied), the PIRF and the ICGM) and the ICGM2.0 for the images taken in the dynamic environment. According to the known method, although the dynamic local feature values are removed, the dynamic local feature values cannot be completely removed. Meanwhile, according to the ICGM2.0, the dynamic local feature values are almost removed.

Illustrated in FIG. 6, in the ICGM, the PIRF, and the ICGM2.0, it seems that the static feature values also decreases as compared to the ORB. Regarding this point, it is considered that an unstable local feature value is removed in the local feature values. Even when the local feature values are from the static object, there are the unstable local feature values that do not exist in the previous and next images or in which matching with prominently different feature values in the previous and next images is obtained in no small measure. Such unstable feature value may be a cause of deteriorating accuracy of performing the SLAM. However, in the ICGM, the PIRF, and the ICGM2.0, such local feature value can be removed with the same algorithm as the dynamic feature value. Thus, in the ICGM, the PIRF, and ICGM2.0, it is considered that the static feature values are also decreased as compared to the ORB.

Therefore, according to the ICGM2.0, it can be understood that is possible to accurately remove the dynamic local feature value and extract the stable and static local feature value as compared to the known method.

In order to further verify the advantage of the ICGM2.0, accuracy of map building using the local feature values extracted by the ICGM2.0 and the known method (visual odometries), and accuracy of localizations when performing Loop-Closing detection will be evaluated.

In the examples hereinafter, the visual odometry is generated by libviso2 (A. Geiger, J. Ziegler, and C. Stiller, "StereoScan: Dense 3D reconstruction in real-time", IEEE Int. Veh. Symp., 2011).

As an evaluation method of the accuracy of the visual odometry, the error rate divided by a length of the visual odometry that is a difference between a start point and end point will be evaluated. The difference between the start point and end point is considered as an error accumulated in a process for generating the visual odometry. Therefore, thus the error rate represents an average error occurring per unit distance. Although an evaluation method using the Ground Truth is general as the evaluation method of the visual odometry, the evaluation is uniformly performed using the error rate because the experimental environment of this study includes an underground and is an environment difficult to acquire the Ground Truth.

As an evaluation method of the accuracy of the localization, using TP, FP, TN, and FN acquired according to Table 1, it is evaluated based on Precision and Recall calculated by expressions (5) and (6).

$$\text{Precision}=TP/(TP+FP) \quad (5)$$

$$\text{Recall}=TP/(TP+FN) \quad (6)$$

TABLE 1

|  |  | Visited place | |
|---|---|---|---|
|  |  | T | F |
| Estimation | T | TP | FP |
|  | F | FN | TN |

An environment in which many people come and go is selected as the experimental environment, and the experiments are separately performed indoors and outdoors. In the experiments, as in the first exemplary embodiment, it is assumed that the threshold value $\text{Thr}_{PIRF}$ for matching the PIRF feature values is 65, and the threshold value $\text{Thr}_{ICGM}$ for the error rate of the ICGM is 0.7.

Second Example: Indoor Experiment

Figure 7:
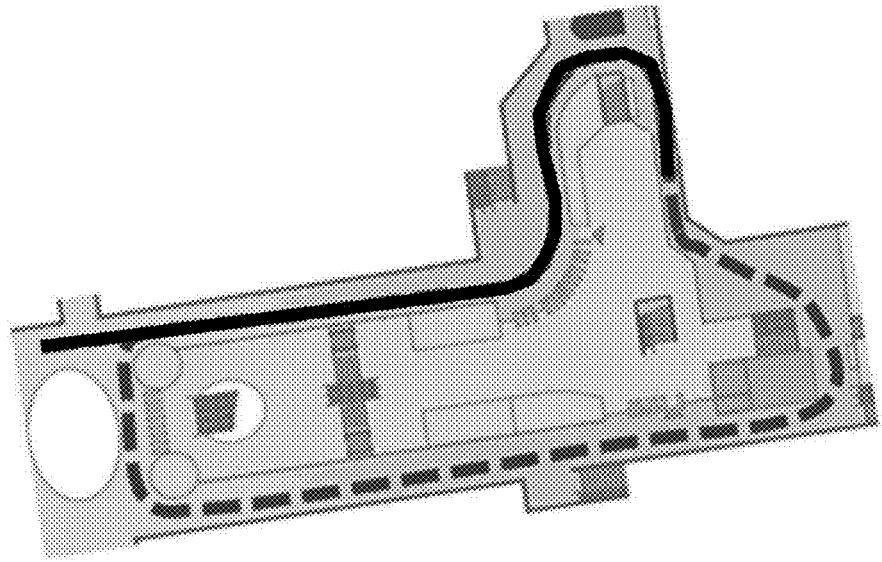
FIG. 7 is a diagram illustrating an indoor experimental environment.

An experimental environment is an indoor environment in front of underground ticket gates at a railway station and is a dynamic environment in which heavy congestion occurs and many people come and go. In FIG. 7, an experimental route is illustrated. In the experiment, an experimenter takes consecutive images with a camera through the experimental route, and generation of a visual odometry based on the consecutive images and localization are performed. In the example of FIG. 7, in an area of approximately 100 m×approximately 50 m, a route of approximately 200 m per lap is used. A dashed line represents a route of a first lap for performing map building, and a solid line represents a route of a second lap for performing localization.

Indoor Visual Odometry

For evaluating the advantage of the ICGM2.0 for the visual odometry, the ICGM, the PIRF, and a case in which only the libviso2 is applied (the case in which neither the ICGM, the PIRF, nor the ICGM2.0 is applied), which are known method, are used as comparison targets. As described above, the libviso2 is used in the present invention, since the dynamic feature value is removed by the ICGM2.0 before the visual odometry is generated by the libviso2, an effect of the ICGM2.0 can be understood by comparing changes of results of the visual odometries with and without the ICGM2.0.

Figure 8:
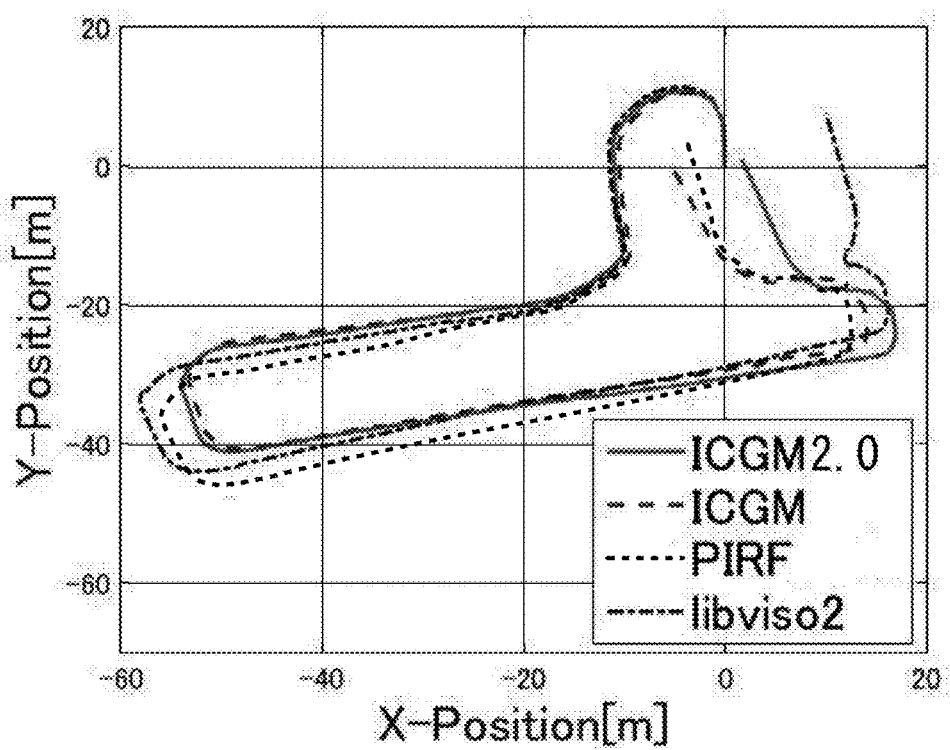
FIG. 8 is a diagram illustrating a result of an indoor experiment (a visual odometry)

FIG. 8 illustrates the visual odometry generated by the indoor evaluation experiment. Table 2 illustrates an error rate of each method and a calculation time per image.

TABLE 2

| Method | Error Rate ± Standard Reviation [%] | Calculation Time ± Standard deviation [s] |
|---|---|---|
| ICGM2.0 | 0.929 ± 0.119 | 0.532 ± 0.011 |
| ICGM | 2.75 ± 0.285 | 0.532 ± 0.009 |
| PIRF | 2.43 ± 0.191 | 0.465 ± 0.000 |
| libviso2 | 5.75 ± 0.120 | 0.312 ± 0.002 |

As illustrated in FIG. 8 and Table 2, the error of the start point and end point is the smallest and the error rate is also small in the ICGM2.0.

Meanwhile, the shape of the visual odometry is different from the original experimental route in the libviso2. As a cause of this, it can be considered that erroneous matching has been obtained due to the dynamic feature value and the unstable feature value from a pedestrian or the like. In contrast, although such phenomenon does not occur in the ICGM2.0, the ICGM, and the PIRF, it is considered that this is because the dynamic feature value and the unstable feature value are removed. As described above, the advantage of the ICGM2.0 has been shown in terms of accurately generating the visual odometry.

Figure 9:
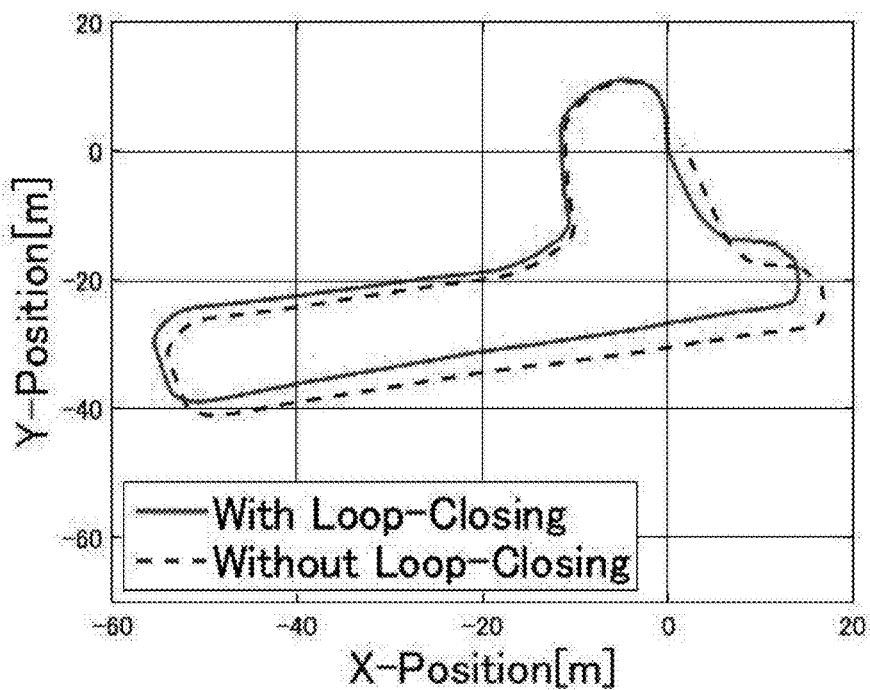
FIG. 9 is a diagram illustrating a result of the indoor experiment (comparison of presence or absence of Loop-Closing)

FIG. 9 illustrates changes of the visual odometries with and without Loop-Closing. Before performing Loop-Closing, there is a difference between the start point and the end point that should be the same point and contradiction arises in a map. On the other hand, after performing Loop-Closing, the contradiction is resolved and the loop has been closed. Since the point at which the loop is closed is the start point and end point that should be originally the same point, it can be considered that Loop-Closing detection has been performed at the correct position. Accordingly, it is considered that the error accumulated when generating the visual odometry has been reduced.

Indoor Localization

Figure 10:
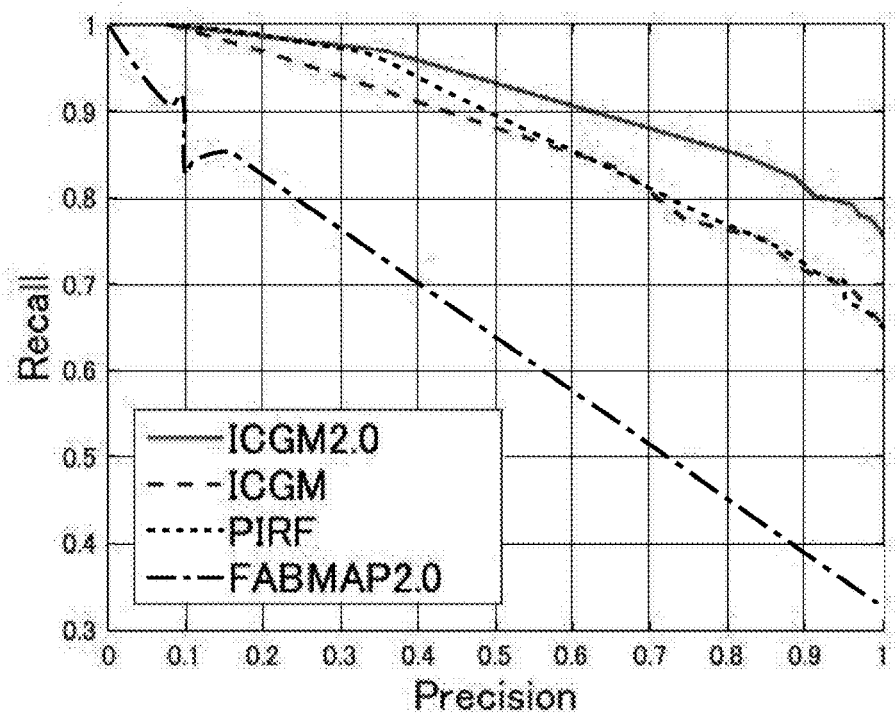
FIG. 10 is a diagram illustrating a result of the indoor experiment (Recall and Precision)

In the experiment, the ICGM, the PIRF, and FABMAP2.0 (M. Cummins, P. Newman, "Highly scalable appearance-only SLAM—FAB-MAP 2.0", The International Journal of Robotics, Systems and Science, 2009) that are the known methods are used as comparison targets with respect to the ICGM2.0. The ICGM and the PIRF are used as the comparison targets because both the ICGM and the PIRF aim to remove the dynamic feature value. The FABMAP2.0 is used as the comparison target because the FABMAP2.0 is a method achieving highly accurate localization among studies of current appearance-only SLAM. FIG. 10 illustrates Precision and Recall calculated from Table 1, and the expressions (5) and (6). Table 3 illustrates Recall and Precision of each method.

TABLE 3

| Method | Recall [%] | Precision [%] |
|---|---|---|
| ICGM2.0 | 75.5 | 100 |
| ICGM | 65.6 | 100 |
| PIRF | 65.2 | 100 |
| FABMAP2.0 | 33.0 | 100 |

From FIG. 10 and Table 3, it is understood that the localization has been most accurately performed in the ICGM2.0. As the reason for this, it is considered that the dynamic feature value (the dynamic local feature values) and unstable feature value (that are regarded as the static local feature value in the known method and regarded as the unstable local feature value in the ICGM2.0 as described above) from people and objects that come and go are removed in the ICGM2.0, and the stable and static feature value can be effectively remained. This can be understood from FIG. 7. Accordingly, the advantage of the ICGM2.0 for localization has been shown.

Third Example

Figure 11:
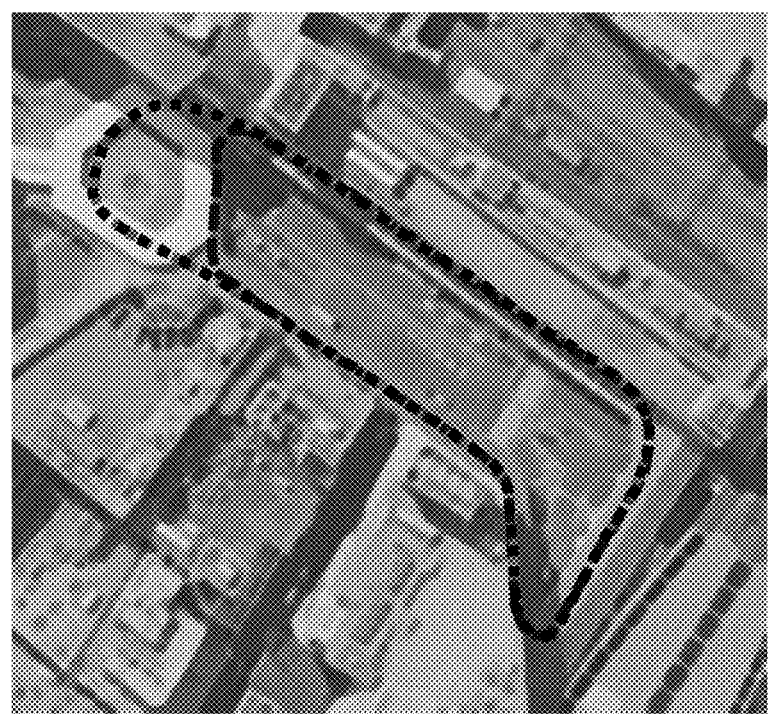
FIG. 11 is a diagram illustrating an outdoor experimental environment.

An experimental environment is an outdoor environment in front of the railway station. The experimental environment is heavily crowded and a dynamic environment in which many people come and go. FIG. 11 illustrates an experimental route. In the experiment, the experimenter takes consecutive images with the camera through the experimental route, and generation of a visual odometry based on the consecutive images and localization are performed. In the example of FIG. 11, in an area of approximately 80 m×approximately 100 m, a route of approximately 230 m per lap is used. A red dashed line represents a route of a first lap for performing map building, and a blue dotted line represents a route of a second lap for performing localization.

Outdoor Visual Odometry

Figure 12:
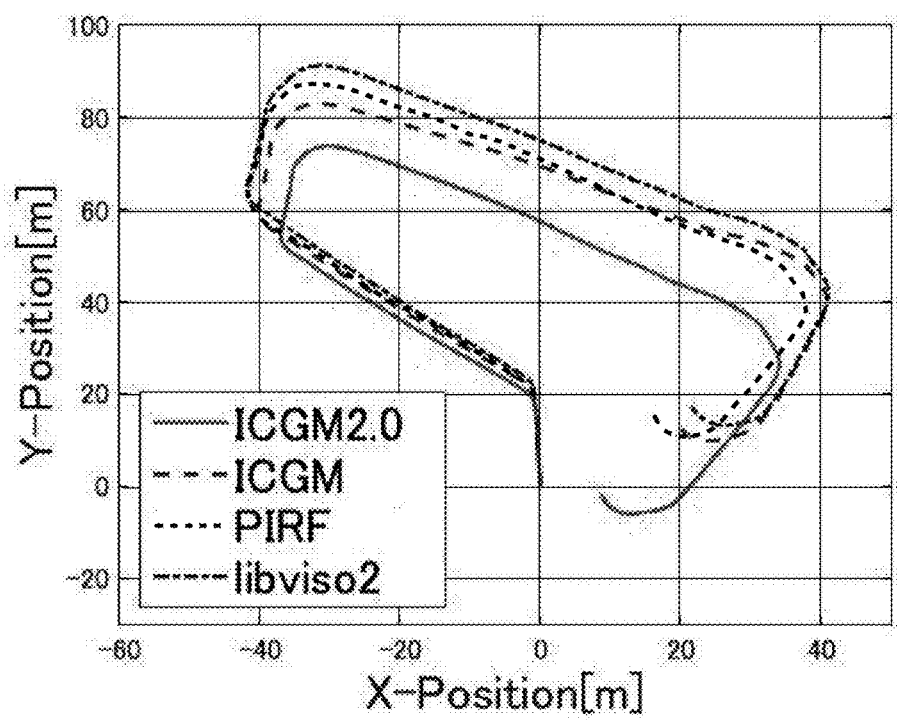
FIG. 12 is a diagram illustrating a result of an outdoor experiment (a visual odometry)

An evaluation of the advantage of the ICGM2.0 for the visual odometry is performed. The ICGM, the PIRF, and the libviso2 that are the known methods are used as comparison targets as in the indoor evaluation experiment. FIG. 12 illustrates a visual odometry generated by the experiment. Table 4 illustrates an error rate and calculation time per image of each method.

TABLE 4

| Method | Error Rate ± Standard Reviation [%] | Calculation Time ± Standard deviation [s] |
| --- | --- | --- |
| ICGM2.0 | 3.93 ± 0.031 | 0.653 ± 0.008 |
| ICGM | 10.1 ± 0.843 | 0.645 ± 0.010 |
| PIRF | 9.40 ± 0.220 | 0.624 ± 0.005 |
| libviso2 | 11.3 ± 0.097 | 0.516 ± 0.003 |

From FIG. 12 and Table 4, the error of the start point and end point are the smallest and the error rate is also small in the ICGM2.0. From this, it can be considered that the ICGM2.0 has advantages for the visual odometry with respect to the known methods regardless of the outdoor and indoor.

Figure 13:
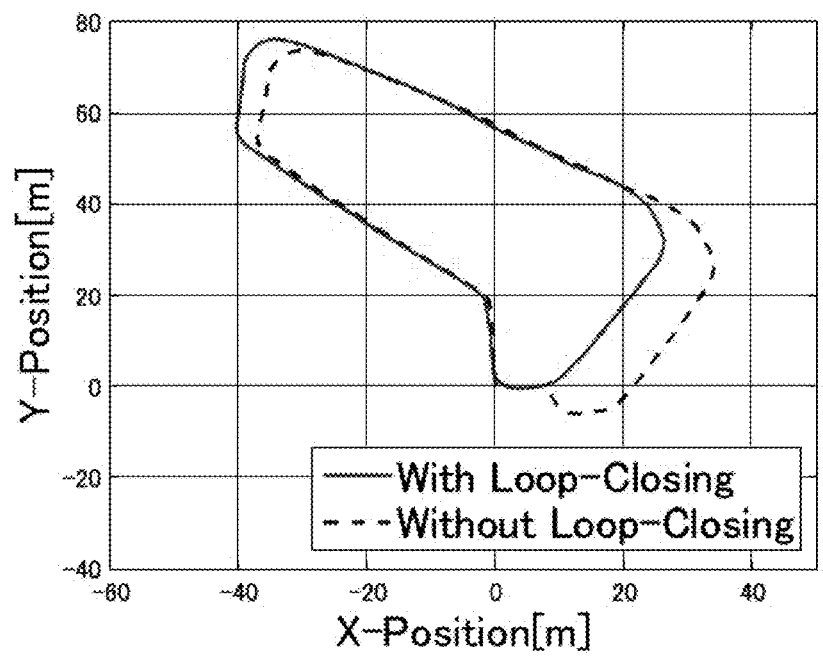
FIG. 13 is a diagram illustrating a result of the outdoor experiment (comparison of presence or absence of Loop-Closing)

FIG. 13 illustrates changes of the visual odometries with and without Loop-Closing. As a result of the Loop-Closing detection performed at the correct position in this result, the error caused between the start point and end point is resolved and the loop is closed. From this, it can be confirmed that the Loop-Closing detection has been performed at the correct position in the outdoor environment.

Accordingly, it is considered that the error accumulated when generating the visual odometry are reduced.

Outdoor Localization

An evaluation of the advantage of the ICGM2.0 for localization is performed. The ICGM, the PIRF, and the FABMAP2.0 that are the known methods are used as comparison targets as in the indoor evaluation experiment.

Figure 14:
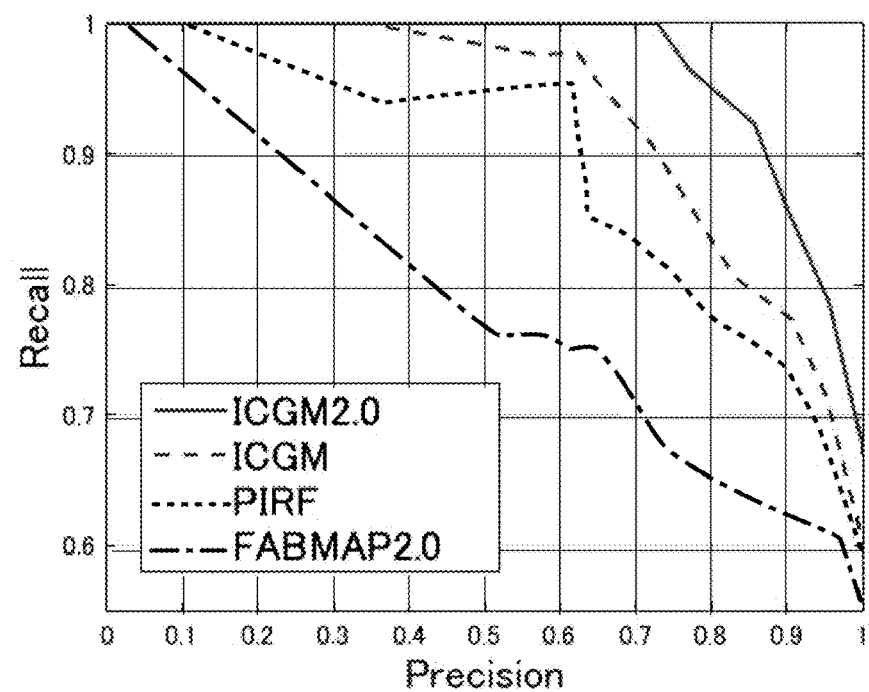
FIG. 14 is a diagram illustrating a result of the outdoor experiment (Recall and Precision)

FIG. 14 illustrates Precision and Recall calculated from Table 1, and the expressions (5) and (6). Table 5 illustrates Recall Precision of each method.

TABLE 5

| Method | Recall [%] | Precision [%] |
| --- | --- | --- |
| ICGM2.0 | 67.0 | 100 |
| ICGM | 59.2 | 100 |
| PIRF | 57.8 | 100 |
| FABMAP2.0 | 56.0 | 100 |

From FIG. 14 and Table 5, it is understood that the localization is most accurately performed in the ICGM2.0. As the reason for this, it is considered that the dynamic feature value and the unstable feature value extracted from people and objects that come and go are removed in the ICGM2.0, and the stable and static feature value can be effectively remained. Accordingly, the advantage of the ICGM2.0 for localization has been shown even in the outdoor environment.

As described above, this study aims to accurately perform the SLAM in the dynamic environment in which many people and objects come and go. Thus, the SLAM method for removing the dynamic feature value using the ICGM2.0 has been established and the method has been evaluated in the dynamic environment. Additionally, it can be confirmed that the ICGM2.0 has advantages with respect to the known methods regardless of the outdoor and indoor in terms of the accuracy when generating the visual odometry and the accuracy of localization.

The above-described SLAM is achieved by using only a monocular camera as an external sensor in this study. The SLAM using only a small and light-weight external sensor such as the monocular camera has many applicable destinations at the present time when smartphones and wearable terminals become popular. This study having highly accurate among them is expected to make a great contribution when the SLAM technology is applied to navigation of people and robots in the real environment in which we live.

Second Exemplary Embodiment

A feature value extraction method and a feature value extraction apparatus according to the present exemplary embodiment are modified examples of the feature value extraction method and the feature value extraction apparatus according to the first exemplary embodiment, which further improves accuracy of extracting the static feature value. Here, the feature value extraction method according to the second exemplary embodiment is also referred to as ICGM2.5.

For extracting the static feature value (corresponding to Step S4 in FIG. 2), in the first exemplary embodiment (ICGM2.0), the dynamic feature value is removed by applying the PIRF to the extracted feature values. Then, the feature values used for a centroid calculation are selected from the feature values after the PIRF processing, and the selected feature value is regarded as the static feature value. However, because it is not guaranteed that the selected feature value is the truly static feature value, when the dynamic feature value that has passed through the PIRF is selected, calculation accuracy of the centroid position in the ICGM deteriorates. As a result, accuracy of the dynamic feature value removal in the ICGM deteriorates, and further, it may happen that the static feature value is unnecessarily removed.

On the other hand, in the ICGM2.5 according to the present exemplary embodiment, a process of further removing the dynamic feature value based on a matching distance after the PIRF is additionally performed to further improve the accuracy of extracting the static feature value. Hereinafter, it is described in detail.

Figure 15:
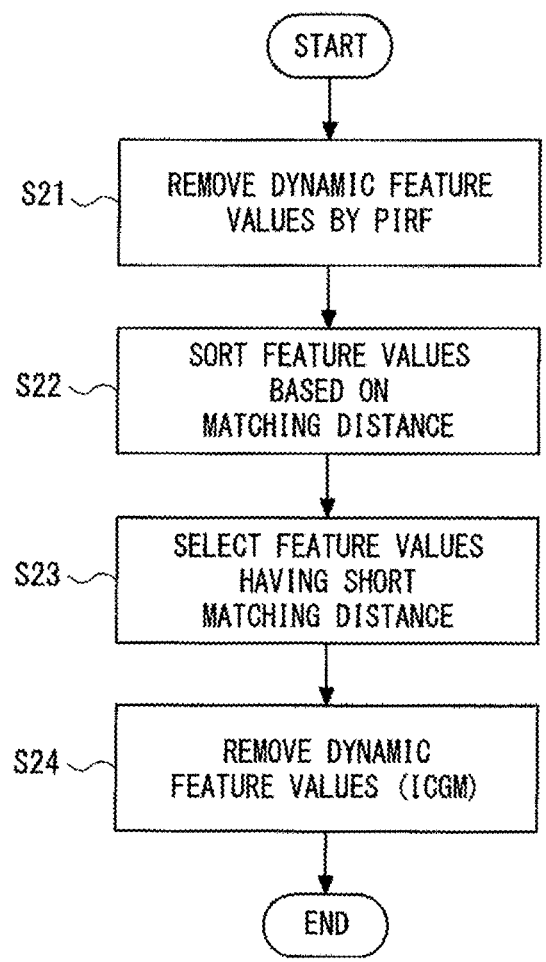
FIG. 15 is a diagram illustrating a method for extracting a static feature value according to a second exemplary embodiment.

FIG. 15 is a diagram illustrating a method for extracting the static feature value according to the second exemplary embodiment. A series of processes illustrated in FIG. 15 corresponds to the process performed in Step S4 in FIG. 2.

Step S21

First, the dynamic feature value is removed from the feature values matched in Step S3 in FIG. 2 by the above-described PIRF.

Step S22

After the dynamic feature value is removed by the PIRF, for each remaining feature value, the matching distance is calculated between different frames in the consecutive images. Then, the matching distance is calculated of each feature value, and the calculated feature values are sorted in ascending order of the matching distances.

The matching distance here is an index representing similarity between two matched feature values and can be acquired from a descriptor of each feature value. The ORB used as the local feature value in the present exemplary embodiment uses a method in which rotation invariance is added to BRIEF (Binary Robust Independent Elementary Features) as a feature description method. For example, the ORB and BRIEF are described in E. Rublee, V. Rabaud, K. Konolige, G. Bradski, "ORB: an efficient alternative to SIFT or SURF", International Conference on Computer Vision (ICCV), November, 2011, and, M. Calonder, V. Lepetit, C. Strecha, and P. Fua., "Brief: Binary robust independent elementary features", European Conference on Computer Vision, 2010, 1, 2, 3, 5. The matching distance in the present exemplary embodiment is the Hamming distance of the ORB feature descriptor represented by a binary code.

Step S23

In the feature values after the sorting, a predetermined number of feature values are selected in ascending order of the matching distances.

Step S24

It is assumed that the selected feature values are the static feature values, and the centroid in the ICGM is calculated using these feature values. Additionally, as with the processing in the ICGM described in the first exemplary embodiment, the dynamic feature value is removed.

Figures 17, 18:
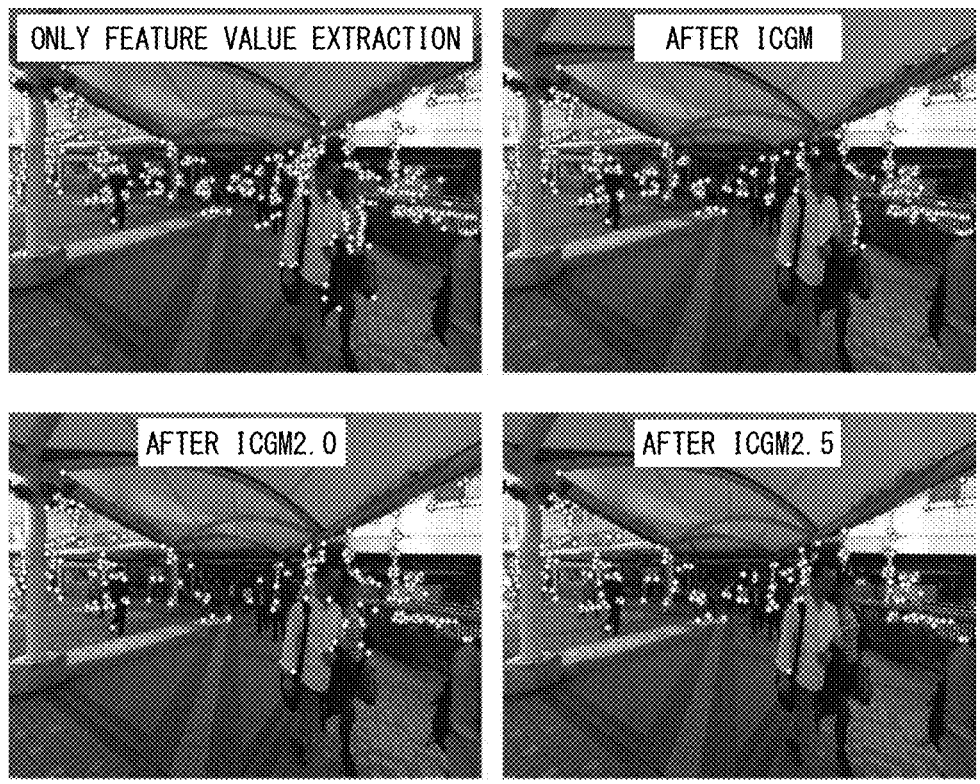
FIG. 17 is a diagram illustrating a PIRF algorithm.
FIG. 18 is a diagram illustrating results of processing for removing the dynamic feature value by applying a known method (an ORB [that is, when neither the PIRF, the ICGM, the ICGM2.0, nor the ICGM2.5 is applied]), the ICGM, the ICGM2.0 and the ICGM2.5 to images taken in a dynamic environment.

FIG. 16 illustrates an ICGM2.5 algorithm extracting the static feature value according to the second exemplary embodiment. Additionally, for reference, FIG. 17 illustrates a PIRF algorithm.

As described above, according to the present configuration and method according to the second exemplary embodiment, after performing the PIRF, the feature values having the small matching distance are selected and the selected feature values are applied to the ICGM used for the centroid calculation. Therefore, when there is the dynamic feature value that has passed through the PIRF, since the dynamic feature value is further selected and removed using the matching distance, it is possible to reduce the concern that the dynamic feature value is included during the ICGM centroid calculation. As a result, compared to the first exemplary embodiment (ICGM2.0), it is possible to extract the static feature value with higher accuracy.

Next, an advantage of the ICGM2.5 will be verified by experiment hereinafter.

Verification of Advantage of ICGM2.5 by Experiment

Fourth Example: Dynamic Feature Value Removal

Here, for verifying the advantage of the ICGM2.5, a result of removing the dynamic feature value will be evaluated. As in the first exemplary embodiment, the environment where many people come and go is selected as an experimental environment for the evaluation. A device used for taking the images in the present experiment is a handheld monocular camera whose resolution is 1280×960 pixels and whose frame rate of the consecutive images is 12 fps. It is assumed that the threshold $Thr_{ICGM}$ for the error rate of the ICGM is 0.7 and the threshold $Thr_{CG}$ for measuring accuracy of the calculated centroid is 0.7. The number of the frames referred to by the PIRF is w=3. The height of the monocular camera is set to 1.6 m from the ground and the pitch angle of the monocular camera is set to 5.3°. The pixel patch size of the feature value when calculating the matching distance is 31. The calculation environment is illustrated in Table 6.

TABLE 6

| | |
|---|---|
| CPU | X5482 3.20 GHz (8 CPUs) |
| OS | Windows7 Enterprise 64 bit |
| Memory | 8 GB |
| Execution Environment | MATLAB R2015a |
| Image Processing Library | OpenCV3.1.0 |

FIG. 18 illustrates results of processing for removing the dynamic feature value by applying the known method (the ORB (that is, when neither the PIRF, the ICGM, the ICGM2.0, nor the ICGM2.5 is applied)), the ICGM, the ICGM2.0, and the ICGM 2.5 to the images taken in the dynamic environment. As described in FIG. 18, in accordance with the ICGM2.5 according to the present exemplary embodiment, it can be understood that the dynamic feature value is further removed as compared to the ICGM and the ICGM2.0. Therefore, it can be understood that the ICGM2.5 can accurately remove the dynamic local feature value and extract a more stable and more static local feature value as compared to the known method, the ICGM, and the ICGM2.0.

In order to further verify the advantage of the ICGM2.5, as in the first exemplary embodiment, accuracy of map-building (the visual odometry) using the local feature value extracted by the ICGM2.5 and the known method will be evaluated.

Fifth Example: Indoor Experiment

An experimental environment is an indoor environment in front of underground ticket gates at the railway station, which is the same as in the first exemplary embodiment. A calculation condition is the same as in the fourth example. FIG. 19 illustrates an image of an indoor experimental environment and a result of extracting feature values by applying the ICGM2.5 to the image. As illustrated in FIG. 19, it is understood that almost no feature points are set on moving objects such as passersby and the dynamic feature values are removed with high accuracy.

Figure 20:
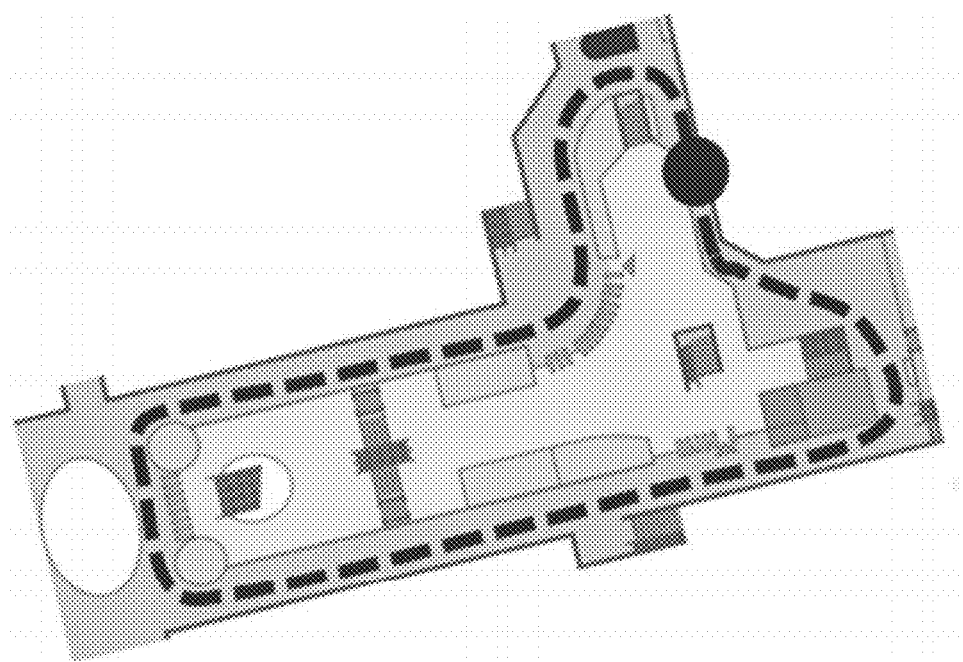
FIG. 20 is a diagram illustrating an indoor experimental route.

Next, an experiment of generating a visual odometry by going around a predetermined indoor route will be described. FIG. 20 illustrates an indoor experimental route.

An experimental route is the same as in the second described in the first exemplary embodiment. In the experiment, a visual odometry in a route that circulates counterclockwise with a position of a point as a start point and an end point (a broken line in FIG. 21).

Indoor Visual Odometry

In order to evaluate an advantage of the ICGM2.5 for the visual odometry, it is assumed that comparison targets are the ICGM, the ICGM2.0, the PIRF, and the case in which only the libviso2 is applied (neither the ICGM, the PIRF, the ICGM2.0, nor the ICGM2.5 is applied).

Figure 21:
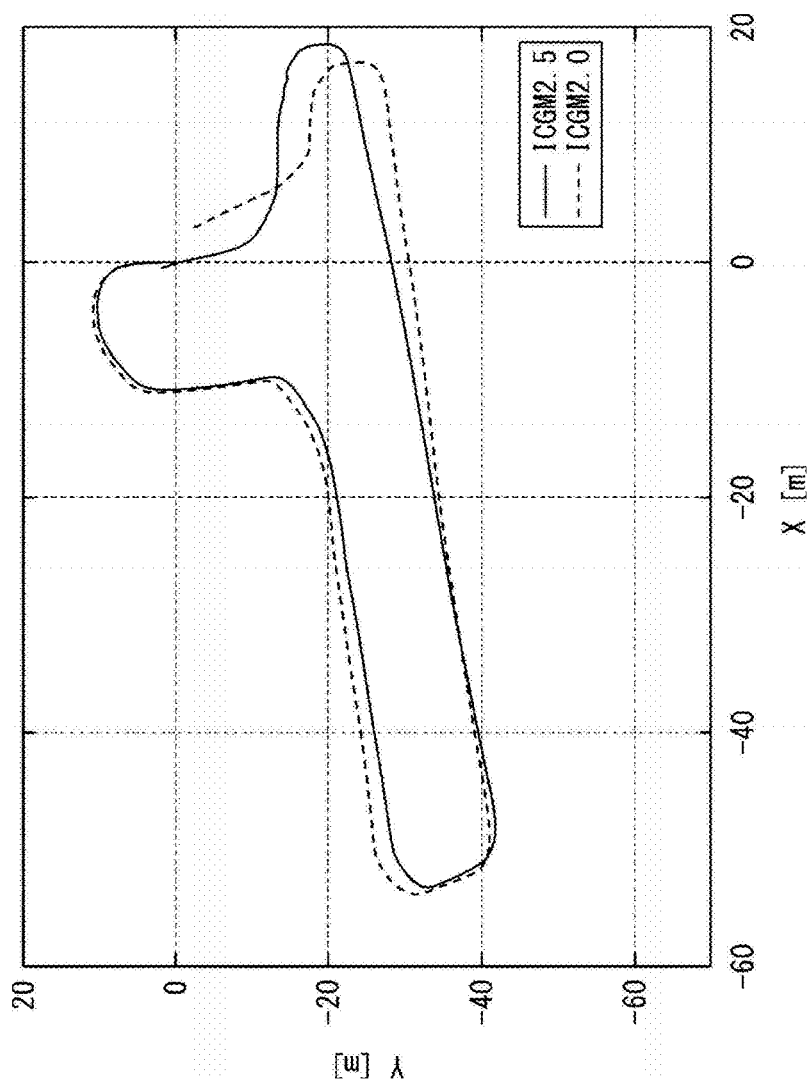
FIG. 21 is a diagram illustrating a visual odometry generated by an indoor evaluation experiment.

FIG. 21 illustrates the visual odometry generated by the indoor evaluation experiment. Table 7 illustrates an error rate and a calculation time per image of each method.

TABLE 7

| Method | Error rate [%] | Time [s] |
|---|---|---|
| ICGM2.5 | 0.46 | 1.22 |
| ICGM2.0 | 2.13 | 1.19 |
| ICGM | 2.75 | 1.20 |
| PIRF | 2.43 | 1.25 |
| Libviso2 | 5.76 | 1.16 |

In FIG. 21, for simplification, only a visual odometry to which the ICGM2.0 according to the first exemplary embodiment is applied and a visual odometry to which the ICGM2.5 according to the second exemplary embodiment is applied are represented.

As illustrated in FIG. 21, the error of the ICGM2.5 between the start point and the end point is smaller than that of the ICGM2.0, and it is understood that the accuracy is further improved. As illustrated in Table 7, the error rate of the ICGM2.5 has become greatly smaller than those of the other methods, and a high advantage of the ICGM2.5 has appeared.

Figure 22:
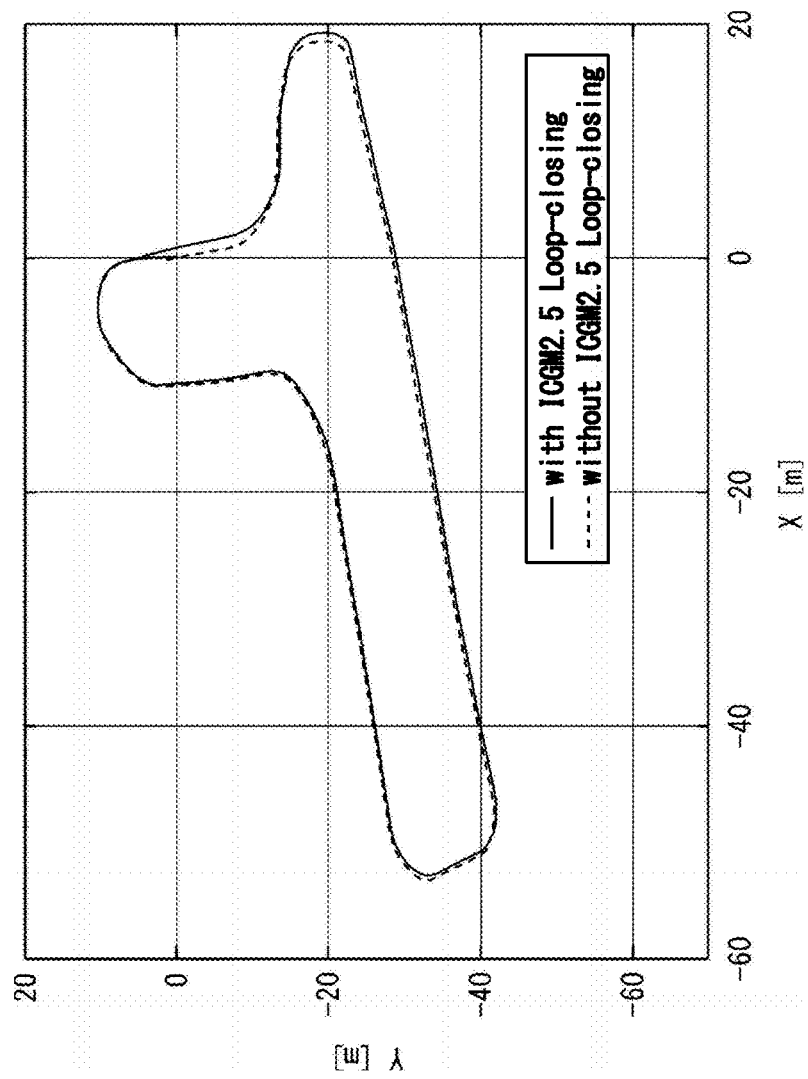
FIG. 22 is a diagram illustrating changes of the visual odometries with and without Loop-Closing.

FIG. 22 illustrates changes of the visual odometries with and without Loop-Closing. In the ICGM2.5 according to the present exemplary embodiment, even before performing Loop-Closing (FIG. 21), the start point and the end point are located in the vicinity, and most of the visual odometries are overlapped even when Loop-Closing is performed. This enables to confirm that the accurate visual odometry can be generated. Therefore, it is considered that the error accumulated when generating the visual odometry is further reduced.

Sixth Example: Outdoor Experiment

Figure 23:
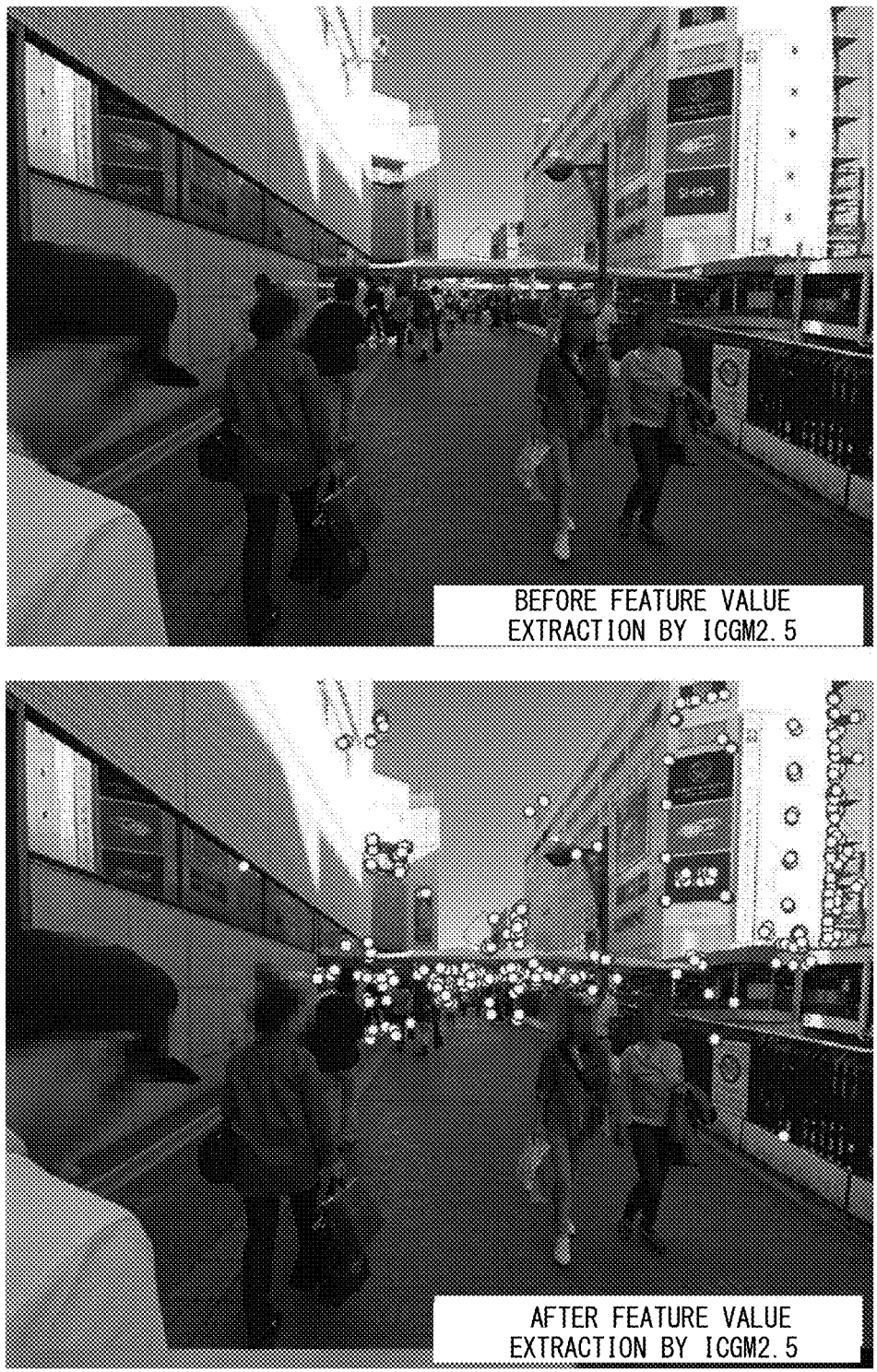
FIG. 23 is a diagram illustrating an image of an outdoor experimental environment and a result of extracting the feature value by applying the ICGM2.5 to the image.

An experimental environment is an outdoor environment in front of the railway station. A calculation condition is the same as in the fourth and fifth examples. FIG. 23 illustrates an image of an outdoor experimental environment and a result of extracting the feature value by applying the ICGM2.5 to the image. As illustrated in FIG. 23, it is understood that almost no feature points are set on moving objects such as passersby and dynamic feature values are removed with high accuracy.

Figure 24:
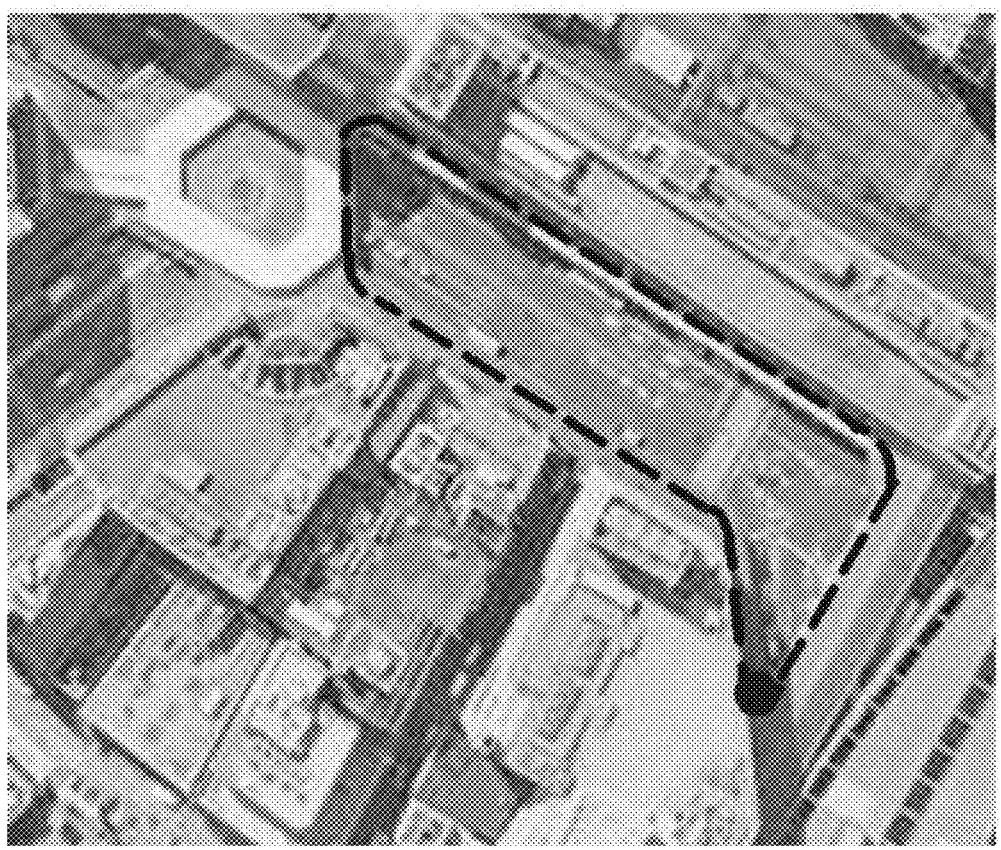
FIG. 24 is a diagram illustrating an outdoor experimental route.

FIG. 24 illustrates an outdoor experimental route. An experimental route is the same as in the sixth example described in the first exemplary embodiment. In the experiment, a visual odometry in a route that circulates clockwise with a position of a point as a start point and an end point (a broken line in FIG. 24).

Outdoor Visual Odometry

Figure 25:
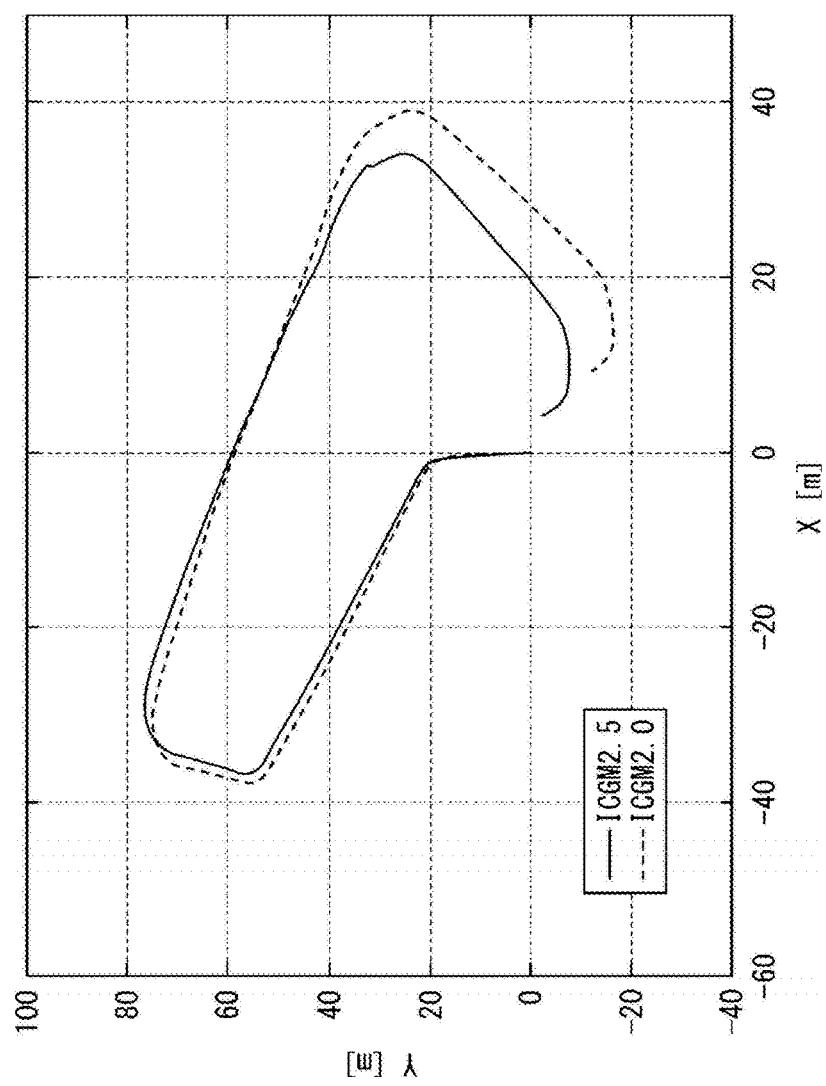
FIG. 25 is a diagram illustrating a visual odometry generated by an outdoor evaluation experiment.

An advantage of the ICGM2.5 relating to the visual odometry will be evaluated. It is assumed that comparison targets are the ICGM, the ICGM2.0, the PIRF, and the libviso2 as in the indoor evaluation experiment. FIG. 25 illustrates the visual odometry generated by the outdoor evaluation experiment. Table 8 illustrates an error rate and a calculation time per image of each method.

TABLE 8

| Method | Error rate [%] | Time [s] |
|---|---|---|
| ICGM2.5 | 2.13 | 1.64 |
| ICGM2.0 | 6.22 | 1.41 |
| ICGM | 8.22 | 1.59 |
| PIRF | 7.52 | 1.54 |
| Libviso2 | 8.92 | 1.48 |

In FIG. 25, for simplification, only the visual odometry to which the ICGM2.0 according to the first exemplary embodiment is applied and the visual odometry to which the ICGM2.5 according to the second exemplary embodiment is applied are represented.

As illustrated in FIG. 25, the error of the ICGM2.5 between the start point and the end point is smaller than that of the ICGM2.0, and it is understood that the accuracy is further improved. As illustrated in Table 8, the error rate of the ICGM2.5 has become greatly smaller than those of the other methods, and a high advantage of the ICGM2.5 has appeared.

Figure 26:
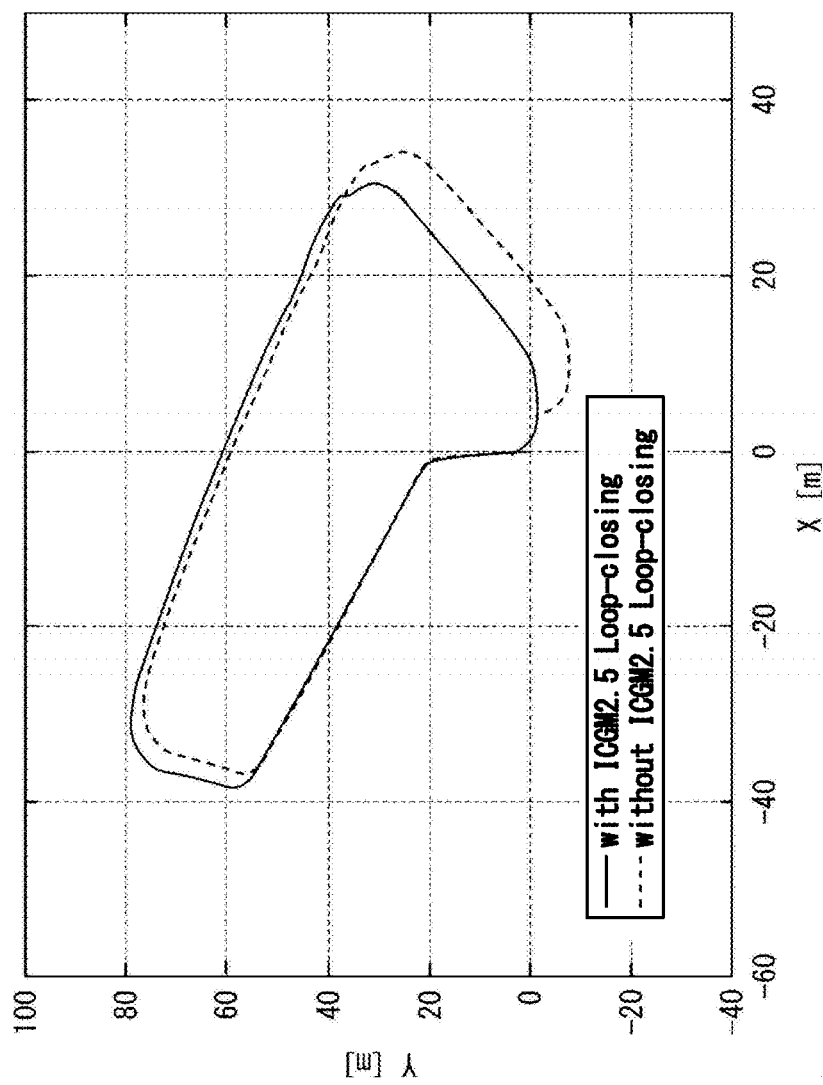
FIG. 26 is a diagram illustrating changes of the visual odometries with and without Loop-Closing.

FIG. 26 illustrates changes of the visual odometries with and without Loop-Closing. Since the experimental environment is outdoor so that there are many dynamic objects and there are more factors such as changes in light intensity than indoors, the start point and the end point before performing Loop-Closing are separated. However, by performing Loop-Closing, it is possible to match the start point and the end point. Therefore, in the ICGM2.5, it can be confirmed that there is only the error to the extent that can be solved by Loop-Closing.

Other Exemplary Embodiment

Further, the present invention is not limited to the above-described embodiments, and needless to say, various modifications can be made without departing from the spirit and scope of the present invention described above.

For, example, although the hardware configurations are described in the exemplary embodiments described above, configurations are not limited to those. It is also possible to achieve any processing by causing a CPU (Central Processing Unit) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention is explained above with reference to embodiments, the present invention is not limited to the above-described embodiments. Various modifications that can be understood by those skilled in the art can be made to the configuration and details of the present invention within the scope of the invention.

This application is based upon and claims the benefit of priority from Japanese patent applications No. 2016-33208, filed on Feb. 24, 2016, and Japanese patent applications No. 2016-84534, filed on Apr. 20, 2016.

REFERENCE SIGNS LIST

1 FEATURE VALUE EXTRACTION APPARATUS
11 CONSECUTIVE IMAGE ACQUISITION UNIT
12 LOCAL FEATURE VALUE EXTRACTION UNIT
13 FEATURE VALUE MATCHING UNIT
14 INVARIANT FEATURE VALUE CALCULATION UNIT

The invention claimed is:

1. A feature value extraction method comprising:
a consecutive image acquisition step of acquiring consecutive images that are consecutively taken;
a local feature value extraction step of extracting a local feature value at each feature point from the consecutive images acquired by the consecutive image acquisition step;
a feature value matching step of performing matching between the consecutive input images for the local feature value extracted by the local feature value extraction step; and
an invariant feature value calculation step of acquiring, in the local feature values for which matching between a predetermined number of consecutive images has been obtained in the feature value matching step, an average of the local feature values whose position changes between the consecutive images are equal to or less than a predetermined threshold value as an invariant feature value, wherein a matching distance is calculated for each matched local feature value,
the matched local feature values are sorted based on the calculated matching distances,
a predetermined number of local feature values are selected from the matched local feature values in ascending order of the matching distance, and
in the selected local feature values, the average of the local feature values whose position changes between the consecutive images are equal to or less than the predetermined threshold value is acquired as the invariant feature value.

2. The feature value extraction method according to claim 1, wherein,
in a first frame of the consecutive images, a centroid position of the selected local feature values selected from the matched local feature values is calculated, and a vector between each of the selected local feature values selected from the matched local feature values and the centroid position,
in a second frame of the consecutive images temporally preceding or succeeding the first frame, a centroid position of the selected local feature values selected from the matched local feature values is calculated, and a vector between each of the selected local feature values selected from the matched local feature values and the centroid position, and,
for each matched local feature value, when an error between the vector acquired in the first frame and the vector acquired in the second frame is equal to or more than a predetermined threshold value, an average of corresponding local feature values is acquired as the invariant feature value.

3. The feature value extraction method according to claim 2, wherein, when the vector acquired in the first frame for each matched local feature value is denoted by $CGV_T$ and the vector acquired in the second frame for each matched local feature value is denoted by $CGVT_{T-1}$, RoD that is the error is expressed by the following expression $$RoD = \frac{\|CGV_T - CGV_{T-1}\|}{\|CGV_T\| + \|CGV_{T-1}\|}.$$

4. A non-transitory computer readable medium storing a program, the program causing a computer to execute the feature value extraction method according to claim 1.

5. A feature value extraction apparatus comprising:
a consecutive image acquisition unit configured to acquire consecutive images that are consecutively taken;
a local feature value extraction unit configured to extract a local feature value at each feature point from the consecutive images acquired by the consecutive image acquisition unit;
a feature value matching unit configured to perform matching between the consecutive input images for the local feature value extracted by the local feature value extraction unit; and
an invariant feature value calculation unit configured to acquire, in the local feature values for which matching between a predetermined number of consecutive images has been obtained by the feature value matching unit, an average of the local feature values whose position changes between the consecutive images are equal to or less than a predetermined threshold value as an invariant feature value, wherein
a matching distance is calculated for each matched local feature value,
the matched local feature values are sorted based on the calculated matching distances,
a predetermined number of local feature values are selected from the matched local feature values in ascending order of the matching distance, and
in the selected local feature values, the average of the local feature values whose position changes between the consecutive images are equal to or less than the predetermined threshold value is acquired as the invariant feature value.

* * * * *